US007055014B1

(12) United States Patent
Pawlowski et al.

(10) Patent No.: US 7,055,014 B1
(45) Date of Patent: May 30, 2006

(54) USER INTERFACE SYSTEM FOR A MULTI-PROTOCOL STORAGE APPLIANCE

(75) Inventors: Brian Pawlowski, Palo Alto, CA (US); Vijayan Rajan, Sunnyvale, CA (US)

(73) Assignee: Network Applicance, Inc., Sunnyvale, CA (US)

( * ) Notice: Subject to any disclaimer, the term of this patent is extended or adjusted under 35 U.S.C. 154(b) by 313 days.

(21) Appl. No.: 10/638,567

(22) Filed: Aug. 11, 2003

(51) Int. Cl.
*G06F 12/00* (2006.01)

(52) U.S. Cl. .......................... 711/202; 711/4; 711/111; 711/112; 711/114; 711/203; 709/220; 709/226

(58) Field of Classification Search ................ 711/202, 711/203, 4, 111, 112, 114; 709/220, 226
See application file for complete search history.

(56) References Cited

U.S. PATENT DOCUMENTS

| | | | |
|---|---|---|---|
| 5,163,131 A | 11/1992 | Row et al. | |
| 5,355,453 A | 10/1994 | Row et al. | |
| 5,485,579 A | 1/1996 | Hitz et al. | |
| 5,802,366 A | 9/1998 | Row et al. | |
| 5,819,292 A | 10/1998 | Hitz et al. | |
| 5,931,918 A | 8/1999 | Row et al. | |
| 5,941,972 A | 8/1999 | Hoese et al. | |
| 5,948,110 A | 9/1999 | Hitz et al. | |
| 5,950,225 A | 9/1999 | Kleiman | |
| 5,963,962 A | 10/1999 | Hitz et al. | |
| 6,038,570 A | 3/2000 | Hitz et al. | |
| 6,065,037 A | 5/2000 | Hitz et al. | |
| 6,138,126 A | 10/2000 | Hitz et al. | |
| 6,289,356 B1 | 9/2001 | Hitz et al. | |
| 6,425,035 B1 | 7/2002 | Hoese et al. | |
| 6,538,669 B1 * | 3/2003 | Lagueux et al. | ............ 715/764 |
| 6,654,830 B1 * | 11/2003 | Taylor et al. | ................. 710/74 |
| 6,745,207 B1 * | 6/2004 | Reuter et al. | ................ 707/200 |
| 6,769,071 B1 * | 7/2004 | Cheng et al. | .................. 714/4 |
| 6,802,021 B1 * | 10/2004 | Cheng et al. | .................. 714/4 |
| 6,823,477 B1 * | 11/2004 | Cheng et al. | ................. 714/26 |
| 2001/0020254 A1 * | 9/2001 | Blumenau et al. | .......... 709/229 |
| 2002/0019908 A1 * | 2/2002 | Reuter et al. | ................ 711/112 |
| 2004/0030668 A1 * | 2/2004 | Pawlowski et al. | ............ 707/1 |
| 2004/0030822 A1 * | 2/2004 | Rajan et al. | .................... 711/4 |

OTHER PUBLICATIONS

David Hitz et al. TR3002 File System Design for a NFS File Server Appliance published by Network Appliance, Inc.
Fielding et al. (1999) Request for Comments (RFC) 2616, HTTP/1.1.
Common Internet File System (CIFS) Version: CIFS-Spec 0.9, Storage Networking Industry Association (SNIA), Draft SNIA CIFS Documentation Work Group Work-in-Progress, Revision Date: Mar. 26, 2001.

(Continued)

*Primary Examiner*—Stephen C. Elmore
(74) *Attorney, Agent, or Firm*—Cesari and McKenna LLP

(57) ABSTRACT

A user interface system that simplifies management of a storage system, such as a multi-protocol storage appliance, by a user or system administrator. The user interface system comprise a command line interface (CLI) and/or a graphical user interface (GUI) that obviates the need for the system administrator to explicitly configure and specify disks used when creating virtual disks (vdisks) that may be exported as logical unit numbers (luns). Management of the storage appliance is further simplified through the use of a novel command set used to, inter alia, create a vdisk, destroy a vdisk, increase/decrease the size of a vdisk, and manage an initiator group (igroup).

35 Claims, 30 Drawing Sheets

OTHER PUBLICATIONS

Maintenance Procedures ND (8C) nd-network disk control Feb. 1985.
Misc. Reference Manual Pages ND (4P) nd-network disk driver Jul. 26, 1985.
Asante EN/SC Adapter Family Installation Guide May 1994.
Asante Desktop EN/SC Adapters User's Manual Apr. 1996.
Performance Without Compromise: The Virtual Storage Architecture 1997.
Anthony J. McGregor Department of Computer Science, University of Waikato Dissertation: Block-Based Distributed File Systems Jul. 1997.

* cited by examiner

USER INTERFACE SYSTEM FOR A MULTI-PROTOCOL STORAGE APPLIANCE

FIELD OF THE INVENTION

The present invention relates to storage systems and, in particular, to a user interface of a storage system that supports logical unit numbers (luns) virtualized through a file system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (lun).

Typical approaches generally address the SAN and NAS environments using two separate solutions. For those approaches that provide a single solution for both environments, the NAS capabilities are typically "disposed" over the SAN storage system platform using, e.g., a "sidecar" device attached to the SAN platform. However, even these prior systems typically divide storage into distinct SAN and NAS storage domains. That is, the storage spaces for the SAN and NAS domains do not coexist and are physically partitioned by a configuration process implemented by, e.g., a user (system administrator). The system administrator makes decisions as to the number of disks and the locations of "slices" (extents) of those disks that are aggregated to construct "user-defined volumes" and, thereafter, how those volumes are used. The term "volume" as conventionally used in a SAN environment implies a storage entity that is constructed by specifying physical disks and extents within those disks via operations that combine those extents/disks into a user-defined volume storage entity.

Typically, the system administrator renders its decisions through a complex user interface oriented towards users that are knowledgeable about the underlying physical aspects of the system. That is, the user interface revolves primarily around physical disk structures and management that the system administrator must manipulate in order to present a view of the SAN platform on behalf of a client. For example, the user interface may prompt the administrator to specify the physical disks, along with the sizes of extents within those disks, needed to construct the user-defined volume. In addition, the interface prompts the administrator for the physical locations of those extents and disks, as well as the manner in which they are "glued together" (organized) and made visible (exported) to a SAN client as a user-defined volume corresponding to a disk or lun. Once the physical disks and their extents are selected to construct a volume, only those disks/extents comprise that volume. The system administrator must also specify the form of reliability, e.g., a Redundant Array of Independent (or Inexpensive) Disks (RAID) protection level and/or mirroring, for that constructed volume. RAID groups are then overlaid on top of those selected disks/extents.

In sum, the prior system approach requires a system administrator to finely configure the physical layout of the disks and their organization to create a user-defined volume that is exported as a single lun to a SAN client. All of the administration associated with this prior approach is grounded on a physical disk basis. For the system administrator to increase the size of the user-defined volume, disks are added and RAID calculations are re-computed to include redundant information associated with data stored on the disks constituting the volume. Clearly, this is a complex and costly approach.

Thus, conventional user interface systems for SAN and NAS storage environments require large amounts of administrator intervention to manage the disks, volumes and/or file systems involved. Additionally, as NAS capabilities are typically overlaid onto a SAN system, any user interface differences force the system administrator to manage multiple sets of commands to configure and control the file systems, disks and/or volumes contained within the storage system environment.

SUMMARY OF THE INVENTION

The disadvantages of the prior art are overcome by providing a user interface system that simplifies management of a storage system, such as a multi-protocol storage appliance, by a user or system administrator. The user interface system comprise a command line interface (CLI) and/or a graphical user interface (GUI) that obviates the need for the system administrator to explicitly configure and specify disks used when creating virtual disks (vdisks) that may be exported as logical unit numbers (luns). Management of the storage appliance is further simplified through the use of a novel command set used to, inter alia, create a vdisk, destroy a vdisk, increase/decrease the size of a vdisk, and manage an initiator group (igroup). These commands are illustratively embodied as igroup and lun commands that accept a variety of options that are then converted into primitive operations ("primitives") and passed to appropriate layers of a storage operating system to be executed by the storage appliance. The commands may be issued via the CLI or GUI, the latter being accessed via, for example, the World Wide Web (WWW). The GUI may be implemented to map certain menu options or other graphical objects including, for example buttons, scroll bars, etc, to the primitives for implementing the desired operations. Alternately, a "wizard" may be utilized either via the CLI or the GUI for creating a new lun and/or igroups. The wizard is illustratively embodied as a series of menu options that guide a system administrator through the process of creating a new lun and/or igroup and binding or mapping the lun to one or more igroups.

In accordance with the user interface, a system administrator first issues a command to create an igroup identifying a set of clients that may access a lun. The lun is then created by the storage operating system and mapped to the igroup. The igroup binds a set of WWNs or iSCSI identifiers (IDs) to a logical name, thereby permitting the system administrator to quickly modify initiator groupings by simply changing the members of the igroup. The created luns permit the administrator to specify an arbitratory size (up to the size of the volume containing the vdisk) and a path name describing the location where the vdisk is stored on the appliance. Thereafter, the system administrator issues a lun map command that maps the created vdisk to one or more igroups, whereby luns that are members of the initiator group, i.e., have a WWN or iSCSI ID contained within the group, may then access the lun for data access operations including, for example reading and writing data.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

The present invention is directed to a user interface for a multi-protocol storage appliance that serves both file and block protocol access to information stored on storage devices in an integrated manner. In this context, the integrated multi-protocol appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (lun) emulation.

Figure 1:
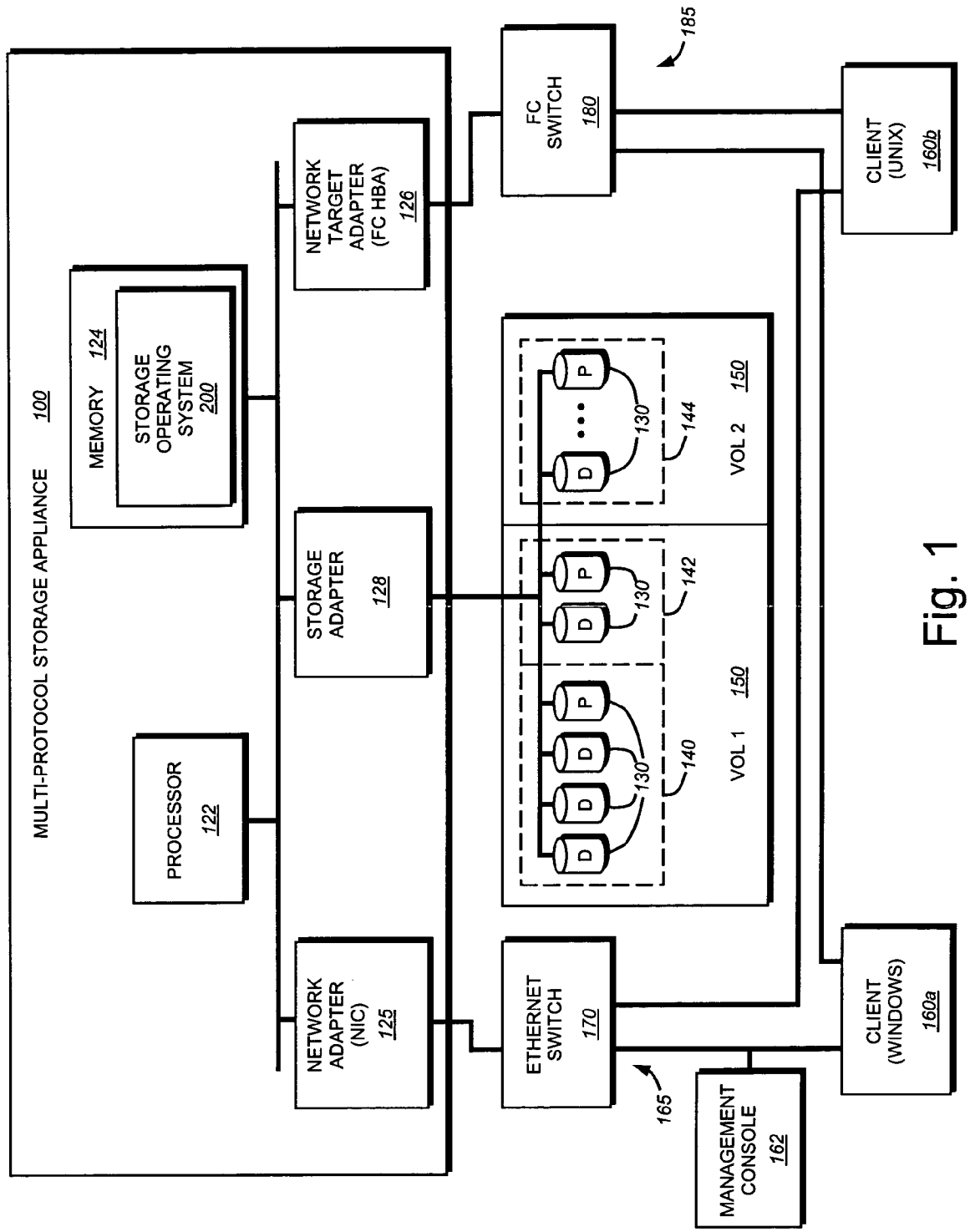
FIG. 1 is a schematic block diagram of a multi-protocol storage appliance configured to operate in storage area network (SAN) and network attached storage (NAS) environments in accordance with the present invention.

FIG. 1 is a schematic block diagram of an exemplary multi-protocol storage appliance 100 configured to provide storage service relating to the organization of information on storage devices, such as disks 130. The storage appliance 100 is illustratively embodied as a storage system comprising a processor 122, a memory 124, a plurality of network adapters 125, 126 and a storage adapter 128 interconnected by a system bus 123. The multi-protocol storage appliance 100 also includes a storage operating system 200 that provides a virtualization system (and, in particular, a file system) to logically organize the information as a hierarchical structure of named directory, file and virtual disk (vdisk) storage objects on the disks 130.

Whereas clients of a NAS-based network environment have a storage viewpoint of files, the clients of a SAN-based network environment have a storage viewpoint of blocks or disks. To that end, the multi-protocol storage appliance 100 presents (exports) disks to SAN clients through the creation of luns or vdisk objects. A vdisk object (hereinafter "vdisk") is a special file type that is implemented by the virtualization system and translated into an emulated disk as viewed by the SAN clients. The multi-protocol storage appliance thereafter makes these emulated disks accessible to the SAN clients through controlled exports, as described further herein.

In the illustrative embodiment, the memory 124 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 200, portions of which are typically resident in memory and executed by the processing elements, finctionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 125 couples the storage appliance to a plurality of clients 160a,b over point-to-point links, wide area networks, virtual private networks implemented over a public network (Internet) or a shared local area network, hereinafter referred to as an illustrative Ethernet network 165. Therefore, the network adapter 125 may comprise a network interface card (NIC) having the mechanical, electrical and signaling circuitry needed to connect the appliance to a network switch, such as a conventional Ethernet switch 170. For this NAS-based network environment, the clients are configured to access information stored on the multi-protocol appliance as files. The clients 160 communicate with the storage appliance over network 165 by exchanging discrete frames or packets of data according to pre-defined protocols, such as the Transmission Control Protocol/Internet Protocol (TCP/IP).

The clients 160 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 160 may request the services of the storage appliance 100 by issuing file access protocol messages (in the form of packets) to the appliance over the network 165. For example, a client 160a running the Windows operating system may communicate with the storage appliance 100 using the Common Internet File System (CIFS) protocol over TCP/IP. On the other hand, a client 160b running the UNIX operating system may communicate with the multi-protocol appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

The storage network "target" adapter 126 also couples the multi-protocol storage appliance 100 to clients 160 that may be further configured to access the stored information as blocks or disks. For this SAN-based network environment, the storage appliance is coupled to an illustrative Fibre Channel (FC) network 185. FC is a networking standard describing a suite of protocols and media that is primarily found in SAN deployments. The network target adapter 126 may comprise a FC host bus adapter (HBA) having the mechanical, electrical and signaling circuitry needed to connect the appliance 100 to a SAN network switch, such as a conventional FC switch 180. In addition to providing FC access, the FC HBA may offload fiber channel network processing operations for the storage appliance.

The clients 160 generally utilize block-based access protocols, such as the Small Computer Systems Interface (SCSI) protocol, when accessing information (in the form of blocks, disks or vdisks) as luns over a SAN-based network. SCSI is a peripheral input/output (I/O) interface with a standard, device independent protocol that allows different peripheral devices, such as disks 130, to attach to the storage appliance 100. In SCSI terminology, clients 160 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier (ID), e.g., a node name or a port name, consisting of an 8-byte number.

The multi-protocol storage appliance 100 supports various SCSI-based protocols used in SAN deployments, including SCSI encapsulated over TCP (iSCSI) and SCSI encapsulated over FC (FCP). The initiators (hereinafter clients 160) may thus request the services of the target (hereinafter storage appliance 100) by issuing iSCSI and FCP messages over the network 165, 185 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/luns in a heterogeneous SAN environment.

In SCSI addressing, each initiator has a WWN or iSCSI name that is used by the initiator to access a lun entity, such as a disk, on the storage appliance. For example, the storage appliance on a FC SAN has a WWN, which is a 64-bit location independent identifier that is typically written in hexadecimal notation. iSCSI names are analogous to WWNs, but with a differing format. Thus iSCSI names are used with the iSCSI protocol as IDs when restricting block-level access to a lun by one or more initiators. Thus, each time an initiator desires access to a lun, the WWN ID or iSCSI name must be provided to the storage appliance by a client/user or the initiator.

The storage adapter 128 cooperates with the storage operating system 200 executing on the storage appliance to access information requested by the clients. The information may be stored on the disks 130 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 122 (or the adapter 128 itself) prior to being forwarded over the system bus 123 to the network adapters 125, 126, where the information is formatted into packets or messages and returned to the clients.

Storage of information on the appliance 100 is preferably implemented as one or more storage volumes (e.g., VOL1–2 150) that comprise a cluster of physical storage disks 130, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Specifically, each volume 150 is constructed from an array of physical disks 130 that are organized as RAID groups 140, 142, and 144. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In one embodiment, a minimum of one parity disk and one data disk may be employed. However, a typical implementation may include three data and one parity disk per RAID group and at least one RAID group per volume.

To facilitate access to the disks 130, the storage operating system 200 implements a write-anywhere file system of a virtualization system that "virtualizes" the storage space provided by disks 130. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the multi-protocol storage appliance via, e.g. a user interface (UI) as a special typed file (object). Illustratively, the vdisk is a multi-inode object comprising a special file inode that holds data and at least one associated streaminode that holds attributes, including security information. The special file inode functions as a main container for storing data, such as application data, associated with the emulated disk. The streaminode stores attributes that allow luns and exports to persist over, e.g., reboot operations, while also enabling management of the vdisk as a single disk object in relation to SAN clients. An example of a vdisk and its associated inodes that may be advantageously used with the present invention is described in co-pending and commonly assigned U.S. patent application Ser. No. 10/216,453 entitled STORAGE VIRTUALIZATION BY LAYERING VDISKS ON A FILE SYSTEM, by Vijayan Rajan et al., which application is hereby incorporated by reference as though fully set forth herein.

B. Storage Operating System

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, available from Network Appliance, Inc, of Sunnyvale, Calif., which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the user interface system described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 2:
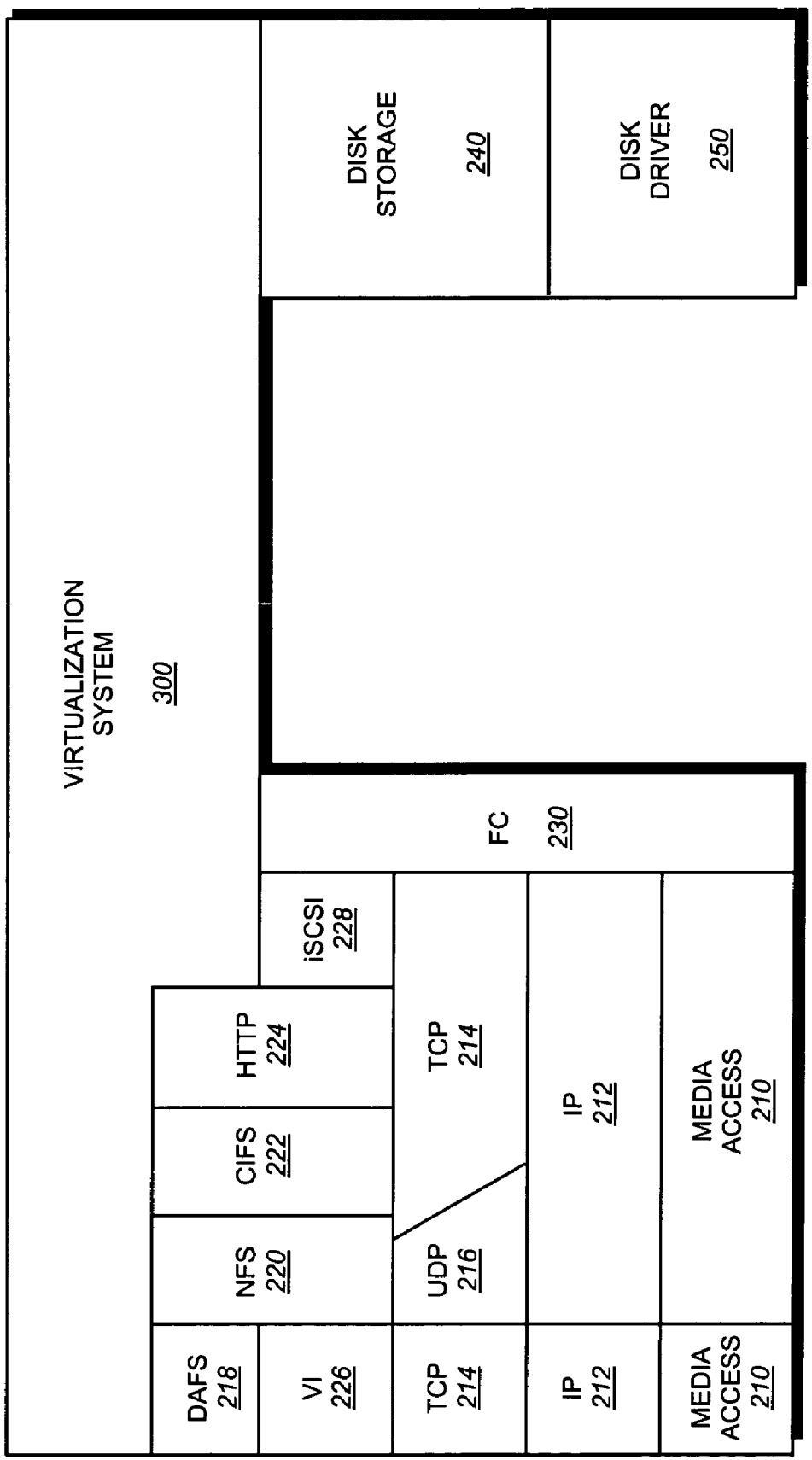
FIG. 2 is a schematic block diagram of a storage operating system of the multi-protocol storage appliance that may be advantageously used with the present invention.

FIG. 2 is a schematic block diagram of a storage operating system 200 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the DAFS protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 operates with the FC HBA 126 to receive and transmit block access requests and responses to and from the integrated storage appliance. The FC and iSCSI drivers provide FC-specific and iSCSI-specific access control to the luns (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 240 that implements a disk storage protocol, such as a RAID protocol, and a disk driver layer 250 that implements a disk access protocol such as, e.g., a SCSI protocol.

Figure 3:
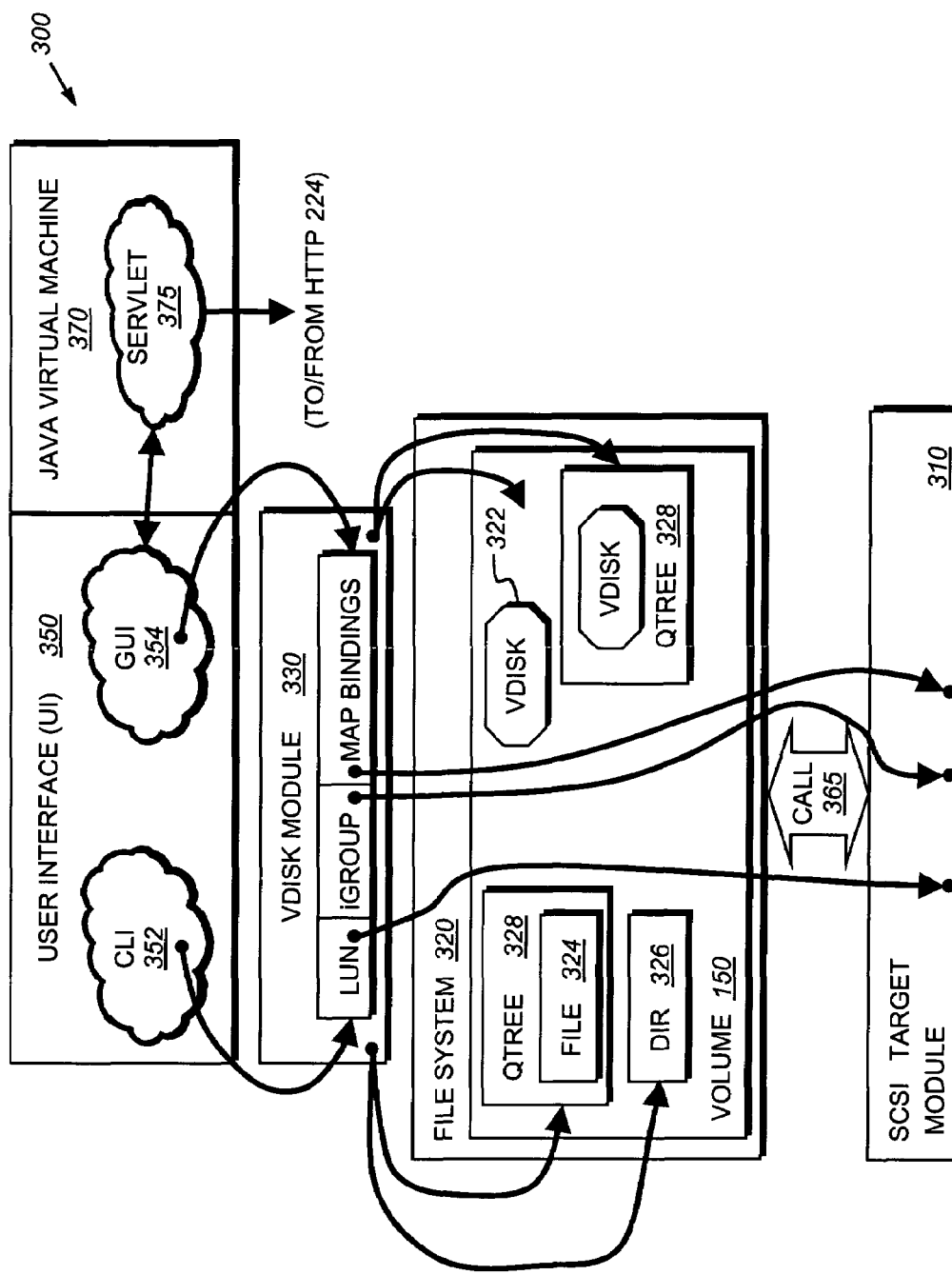
FIG. 3 is a schematic block diagram of a virtualization system that is implemented by a file system interacting with virtualization modules according to the present invention.

Bridging the disk software layers with the integrated network protocol stack layers is a virtualization system 300. FIG. 3 is a schematic block diagram of the virtualization system 300 that is implemented by a file system 320 cooperating with virtualization modules illustratively embodied as, e.g., vdisk module 330 and SCSI target module 310. It should be noted that the vdisk module 330, file system 320 and SCSI target module 310 can be implemented in software, hardware, firmware, or a combination thereof. The vdisk module 330 is layered on (and interacts with) the file system 320 to provide a data path from the block-based SCSI target module to blocks managed by the file system. The vdisk module also enables access by administrative interfaces, such as a novel user interface (UI 350). In essence, the vdisk module 330 manages SAN deployments by, among other things, implementing a comprehensive set of vdisk (lun) commands issued through a management console 162 that may also be interconnected with the storage appliance. The UI 350 and management console 162 cooperate to provide a novel user interface system having a command line interface (CLI) and/or a graphical user interface (GUI) for storage system management as described herein. The vdisk commands are converted to primitive file system operations ("primitives") that interact with the file system 320 and the SCSI target module 310 to implement the vdisks.

In the illustrative embodiment, a Java Virtual Machine (JVM) 370 also interacts with the UI 350 to provide the novel user interface system. The JVM 370 comprises a number of servlets 375 that create the appropriate GUI objects and forward them to the management console via, e.g., the HTTP protocol layer 224. It should be noted that in alternate embodiments the various GUI objects may be created using any acceptable remote GUI system, including, for example, Flash, dynamic HTML (DHTML), X-Window, etc.

The SCSI target module 310, in turn, initiates emulation of a disk or lun by providing a mapping procedure that translates logical block access to luns specified in access requests into virtual block access to the special vdisk file types and, for responses to the requests, vdisks into luns. The SCSI target module is illustratively disposed between the FC and iSCSI drivers 228, 230 and the file system 320 to thereby provide a translation layer of the virtualization system 300 between the SAN block (lun) space and the file system space, where luns are represented as vdisks. By "disposing" SAN virtualization over the file system 320, the multi-protocol storage appliance reverses the approaches taken by prior systems to thereby provide a single unified storage platform for essentially all storage access protocols.

The file system provides capabilities for use in file-based access to information stored on the storage devices, such as disks. In addition, the file system provides volume management capabilities for use in block-based access to the stored information. That is, in addition to providing file system semantics (such as differentiation of storage into discrete objects and naming of those storage objects), the file system 320 provides functions normally associated with a volume manager including (i) aggregation of the disks, (ii) aggregation of storage bandwidth of the disks, and (iii) reliability guarantees, such as mirroring and/or parity (RAID), to thereby present one or more storage objects layered on the file system. A feature of the multi-protocol storage appliance (and the novel user interface) is the simplicity of use associated with these volume management capabilities, particularly when used in SAN deployments.

The file system 320 illustratively implements the WAFL file system having an on-disk format representation that is block-based using, e.g., 4 kilobyte (kB) blocks and using inodes to describe the files. The WAFL file system uses files to store meta-data describing the layout of its file system; these meta-data files include, among others, an inode file. A file handle, i.e., an identifier that includes an inode number, is used to retrieve an inode from disk. A description of the structure of the file system, including the inode file, is provided in U.S. Pat. No. 5,819,292, entitled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which is hereby incorporated by reference as though fully set forth herein.

Figure 4:
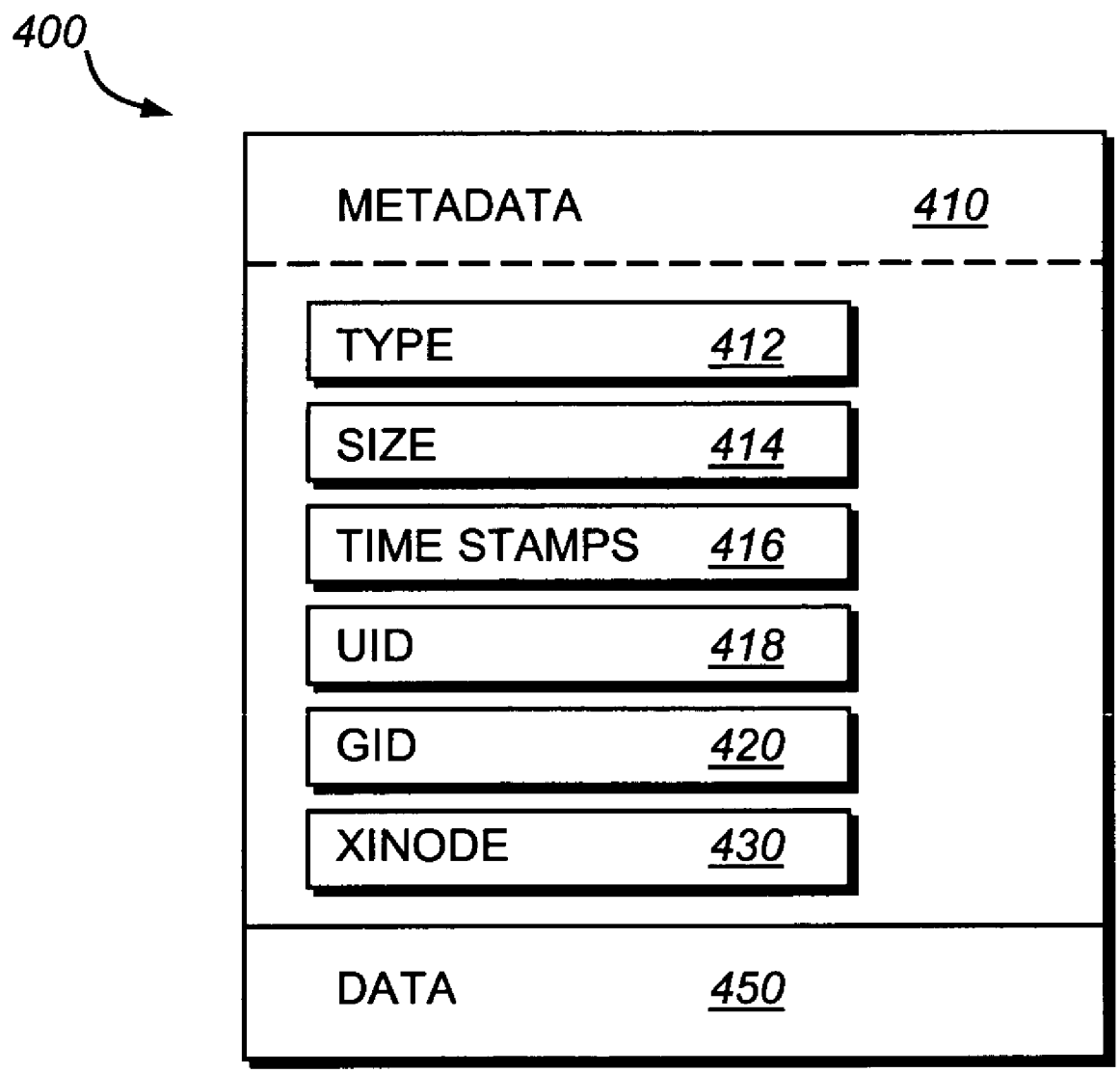
FIG. 4 is a schematic block diagram of an exemplary inode in accordance with an embodiment of the present invention.

FIG. 4 is a schematic block diagram illustrating an exemplary on-disk inode 400, which includes a meta data section 410 and a data section 450. The information stored in the metadata section 410 of each inode 400 describes the file and, as such, includes the type (e.g., regular or directory) 412 of file, the size 414 of the file, time stamps (e.g., access and/or modification) 416 for the file and ownership, i.e., user identifier (UID 418) and group ID (GID 420), of the file. The meta data section 410 further includes a xinode field 430 containing a pointer that references another on-disk inode structure containing, e.g., access control list (ACL) information associated with the file or directory. The contents of the data section 450 of each inode, however, may be interpreted differently depending upon the type of file (inode) defined within the type field 412. For example, the data section 450 of a directory inode contains meta data controlled by the file system, whereas the data section of a regular inode contains user-defined data. In this latter case, the data section 450 includes a representation of the data associated with the file.

Specifically, the data section 450 of a regular on-disk inode may include user data or pointers, the latter referencing 4 kB data blocks on disk used to store the user data. Each pointer is preferably a logical volume block number to thereby facilitate efficiency among the file system and the disk storage (RAID) layer 240 when accessing the data on disks. Given the restricted size (128 bytes) of the inode, user data having a size that is less than or equal to 64 bytes is represented, in its entirety, within the data section of that inode. However, if the user data is greater than 64 bytes but less than or equal to 64 kB, then the data section of the inode comprises up to 16 pointers, each of which references a 4 kB block of data on the disk. Moreover, if the size of the data is greater than 64 kilobytes but less than or equal to 64 megabytes (MB), then each pointer in the data section 450 of the inode references an indirect inode that contains 1024 pointers, each of which references a 4 kB data block on disk. Each data block is loaded from disk 130 into memory 124 in order to access the data. In addition, the size field 414 of the meta data section 410 of the inode refers to the size of the file.

Broadly stated, all inodes of the file system are organized into the inode file. A file system (FS) info block specifies the layout of information in the file system and includes an inode of a file that includes all other inodes of the file system. Each volume has an FS info block that is preferably stored at a fixed location within, e.g., a RAID group of the file system. The inode of the root FS info block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

Referring again to FIG. 3, the file system implements access operations to vdisks 322, as well as to files 324 and directories (dir 326) that coexist with respect to global space management of units of storage, such as volumes 150 and/or qtrees 328. A qtree 328 is a special directory that has the properties of a logical sub-volume within the namespace of a physical volume. Each file system storage object (file, directory or vdisk) is illustratively associated with one qtree, and quotas, security properties and other items can be assigned on a per-qtree basis. The vdisks and files/directories may be layered on top of qtrees 328 that, in turn, are layered on top of volumes 150 as abstracted by the file system "virtualization" layer 320.

Note that the vdisk storage objects in the file system 320 are generally associated with SAN deployments of the multi-protocol storage appliance, whereas the file and directory storage objects are associated with NAS deployments of the appliance. The files and directories are generally not accessible via the FC or SCSI block access protocols; however, a file can be converted to a vdisk and then accessed by either the SAN or NAS protocol. The vdisks are thus accessible as luns from the SAN (FC and SCSI) protocols and as files by the NAS (NFS and CIFS protocols).

The vdisk module 330 introduce attributes and persistent lun map bindings that assign numbers to a created vdisk. These lun map bindings are thereafter used to export vdisks as certain SCSI identifiers (IDs) to the clients. In particular, the created vdisk can be exported via a lun mapping technique to enable a SAN client to "view" (access) a disk. Vdisks (luns) generally require strict controlled access in a SAN environment; sharing of luns in a SAN environment typically occurs only in limited circumstances, such as clustered file systems, clustered operating systems and multi-pathing configurations. A system administrator of the multi-protocol storage appliance determines which vdisks (luns) can be exported to a SAN client. Once a vdisk is exported as a lun, the client may access the vdisk over the SAN network utilizing a block access protocol, such as FCP and iSCSI.

As noted, a vdisk is a special file type in a volume that derives from a plain (regular) file, but that has associated export controls and operation restrictions that support emulation of a disk. Illustratively, the vdisk is a multi-inode object comprising a special file inode and a plurality of associated streaminodes, including an attributes streaminode and a lunmap streaminode. The special file (lun) inode functions as a data container for storing data, such as application data, associated with the emulated disk. The lunmap inode contains a list of initiator groups (igroups) to which the vdisk is exported, along with one or more addresses associated with one or more initiators that are assigned to each igroup.

Figure 5:
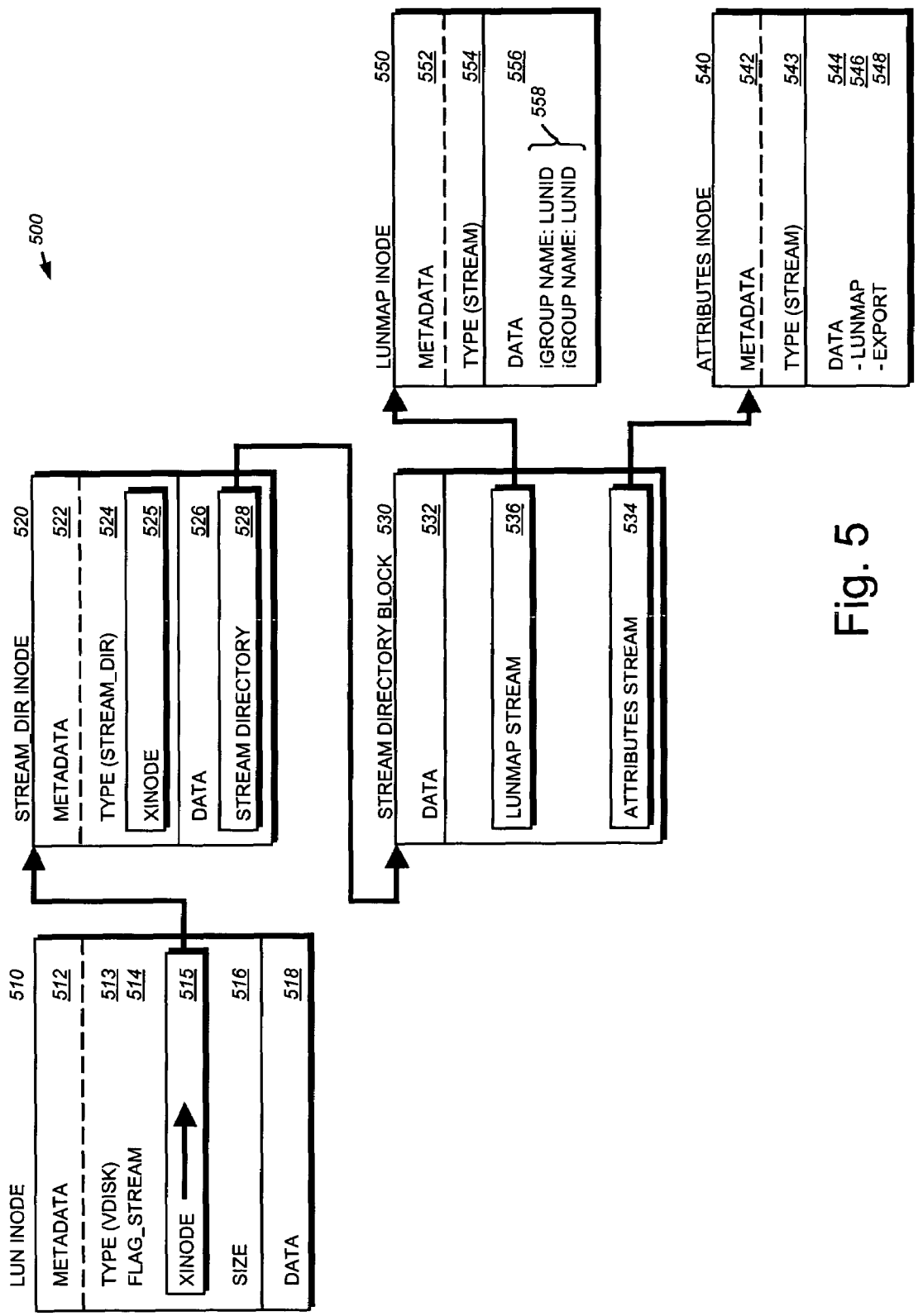
FIG. 5 is a schematic block diagram of an exemplary virtual disk structure in accordance with an embodiment of the present invention.

FIG. 5 is a schematic block diagram illustrating an on-disk representation of vdisk inode data structures 500, including a lun inode 510, an attributes inode 540 and a lunmap inode 550. As noted, the lun inode 510 is the special file inode that functions as a data container for storing application data associated with the vdisk 322. That is, the lun inode comprises a data section 518 that may store the actual application data or pointers referencing 4 kB data blocks on disk used to store the data, as described in FIG. 4. The data stored in this "default" data container can be retrieved (read) and stored (written) by a client using conventional block access protocols, such as the SCSI protocol. When appropriately configured, a vdisk may also be accessed using conventional file-level access protocols, such as the NFS protocol. In this configuration, a vdisk "appears" to be a regular file for such accesses. The lun inode 510 also comprises a meta data section 512 containing meta data such as the type 513 (i.e., a special vdisk type) and size 516 of the vdisk that, upon creation of the inode, is zero. A flag_stream flag 514 identifies the lun inode 510 as having one or more stream "sections", as provided by stream_dir inode 520.

In order to access the stream_dir inode 520, the pointer of xinode field 515 in lun inode 510 is modified to reference the inode 520. The stream_dir inode 520 comprises a meta data section 522 that includes a type (stream_dir) field 524 and an xinode field 525 that references another on-disk inode structure containing, e.g., access control (such as CIFS permission) information associated with the vdisk. The inode 520 also includes a data section 526 containing a pointer 528 that references a stream directory data block associated with the vdisk, such as stream directory block 530. The stream directory block 530 comprises a data section 532 that includes a plurality of entries, each containing an external representation of a streaminode along with mapping information (i.e., the inode number) for that inode. Two of those entries, entries 534 and 536, contain mapping information (e.g., pointers) that reference the attributes (stream) inode 540 and the lunmap (stream) inode 550, respectively.

The attributes inode 540 comprises a meta data section 542 that includes a type (stream) field 543 and a data section 544 that functions as a persistent store for holding various named attributes associated with the vdisk 322. Attributes are an implementation mechanism that is internal to the file system and not managed by users. Examples of attributes include a lun map 546 and export information 548 controlling access to the vdisk by, e.g., specifying a list of initiators to which the vdisk is exported (i.e., those that have permissions to access to the vdisk). The lumnap inode 550 comprises a meta data section 552 that includes a type (stream) field 554 and a data section 556 that functions as a persistent store for holding a list 558 of name-value pairs. The name is illustratively an igroup name and the value is a lun ID.

C. Initiator Groups

SAN clients typically identify and address disks by logical numbers or luns.

However, an "ease of management" feature of a storage appliance is that system administrators can manage vdisks and their addressing by logical names. To that end, the novel user interface 350 interacts with the vdisk module 330 and SCSI target module 310 to map logical names to vdisks.

An igroup is a logical named entity that is assigned to one or more addresses, e.g., WWN or iSCSI IDs, associated with one or more initiators (depending upon whether a clustered environment is configured). The multi-protocol storage appliance manages export control of vdisks by logical names through the use of igroups. When an igroup is created, the addresses are essentially "bound" (associated) to a logical name or igroup. Therefore, rather than having to specify these IDs when desiring access to a vdisk, an initiator need only specify the name of the igroup.

In the illustrative embodiment, vdisks (luns) are "layered" on top of igroups. The igroup abstracts the underlying details of "naming" (i.e., identification) of clients or initiators that desire access to the vdisks. The naming details (for purposes of allowing access to a vdisk/lun by a client/initiator) may be completely different between block access protocols, such as FCP and iSCSI. However, the logical naming of igroups is consistent with the FC and SCSI standards; the user interface system, described herein, represents an application of those standards that simplifies access to the vdisks. The igroup abstraction thus decouples implementation of addressing from the underlying details of addressing. In other words, an igroup allows a user to define client or related clients addressing by logical names that are then used by higher layer vdisk (lun) commands to allow access. As a result, a vdisk (lun) can be easily shared over iSCSI and FCP, thereby allowing use in applications such as a mixed iSCSI or FCP cluster. Moreover, reorganization or upgrades of client/initiators do not affect security assignments (allowing access) at the lun level, since they are indirect via the logical igroup name.

Figure 6:
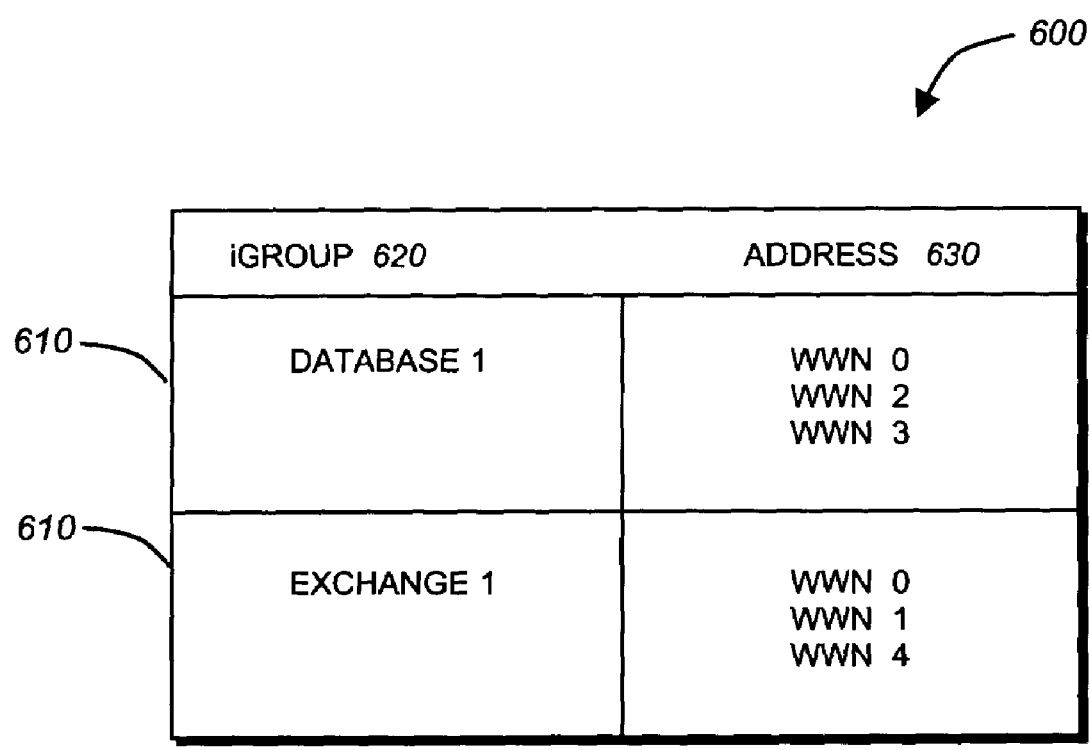
FIG. 6 is a schematic block diagram of an exemplary igroup data structure in accordance with an embodiment of the present invention.

FIG. 6 is a schematic representation of an igroup data structure 600 having a plurality of igroup definition entries 610 that may be advantageously used with the present invention. Each definition 610 includes an igroup field 620 that identifies a particular human friendly igroup name and an address field 630 that identifies one or more addresses (e.g., WWN addresses or iSCSI IDs) associated with one or more initiators assigned to the igroup. For example, igroup "database 1" is assigned a plurality of WWN 64-bit hexadecimal values 0, 2, 3, each of which associates a particular initiator member to that igroup. Similarly, igroup "exchange 1" is assigned WWN values 0, 1, 4, each associating an initiator member to that igroup.

The user interface system also includes a method of assigning a lun ID to a vdisk and specifying the igroup of initiators that are allowed access to the vdisk, i.e., the clients to which the vdisk is exported. Each igroup has certain associated attributes, such as transport protocol type and operating system type of its member initiators (node names). For example, the initiators within an igroup illustratively support the FCP and iSCSI transport protocol type. The operating system type attribute refers to the operating system type of the member initiators in the igroup. This latter attribute is provided because a SCSI target (such as the multiprotocol storage appliance) often "behaves" differently when interacting with different operating systems (e.g., Solaris, Windows, and Linux) of the initiators. Processing of a request received at the storage appliance occurs at lower layers of the storage operating system. Since addresses (WWN or iSCSI IDs) are bound to igroup name, these lower layers "know" whether the request is received over, e.g., an iSCSI or FCP transport.

The igroup need not be homogeneous in terms of these attributes, i.e., an igroup can contain initiators having different combinations of FCP and iSCSI as a transport. For example, iSCSI and FCP initiators may be combined into a single igroup. In addition, an igroup can support various operating system initiator members. This allows operations, such as graceful rolling upgrade of a FC SAN cluster to an iSCSI cluster, with no application downtime. In addition, membership of the igroups can be modified at any time, i.e., initiators can be added to or removed from an igroup and, as a consequence, inherit or lose the mappings of the igroup, respectively.

D. User Interface

Management of the integrated multi-protocol storage appliance 100 is simplified through the use of the novel UI 350 and the igroup and lun command set available to the system administrator. The UI 350 illustratively comprises both a command line interface (CLI 352) and a graphical user interface (GUI 354) used to implement a vdisk command set to, among other things, create a vdisk, increase/decrease the size of a vdisk and/or destroy a vdisk. Commands entered via the UI, whether via the CLI or GUI, are converted using conventional user interface techniques into a set of file system primitives to implement the desired vdisk and/or igroup changes.

Command Line Interface

The UI 350 simplifies the management of storage appliance by, e.g., obviating the need for system administrators to explicitly configure and specify the disks, extants and/or blocks to be used when creating a vdisk. To accomplish such simplified management, the illustrative UI provides two CLI commands: an igroup command and a lun command. The igroup command includes a variety of options described further below, for creating, destroying, and managing the igroups associated with a given storage system. Similarly, the lun command, along with a variety of options, permits a system administrator to create, destroy, and/or manage luns associated with the storage system.

An example of the igroup command is:

igroup create -f/i <groupname><nodename(s)> wherein the <groupname> parameter indicates the name of the igroup and the <nodename(s)> parameter indicates the initiators, e.g., the WWN or iSCSI address IDs to be bound to the igroup. The f/i options determine whether the nodenames to be listed are FCP WWNs (the -f option) or iSCSI addresses (the -i option). The create option creates a new igroup by essentially binding the WWN addresses or iSCSI IDs to a logical name or igroup. The igroup command and the creation of the appropriate igroup data structures, stream fields and file system primitive operations are further described in U.S. patent application Ser. No. 10/421,576, entitled CONSISTENT LOGICAL NAMING OF INITIATOR GROUPS, by Mohan Srinivasan, et al., the contents of which are hereby incorporated by reference.

In alternate embodiments, various other options may be implemented with the igroup command, including, e.g., a destroy option to delete an igroup. When a user enters (activates) an igroup destroy command at the CLI 352, the storage operating system removes the appropriate igroup data structures and stream fields and "unbinds" the WWN address or iSCSI IDs from the logical name. Another option is an igroup show command that displays all igroups and their associated network addresses.

An igroup may contain one initiator in the case of a simple initiator-to-initiator group binding (or more initiators in the case of SAN cluster or a single client with multiple initiators for redundancy and/or multipathing purposes). The created igroup thus enables groupings of initiators by human-friendly logical name.

An example of a lun command is:

lun create -s<size><pathname> wherein, the create option specifies creation of a lun (vdisk), the -s option specifies a size of the vdisk to be created and the <pathname> parameter is a qualified path to the created vdisk. In the exemplary embodiment, a size may be denoted using a variety of suffixes to the numerical identifier including, for example b (bytes), k (kilobytes), m (megabytes), g (gigabytes) or t (terabytes). As will be noted by one skilled in the art, various other sizing identifiers may be utilized in accordance with the teachings of the present invention.

The result of the lun create command is the creation of a vdisk having the specified size and that is RAID protected without having to explicitly specify such protection. Storage of information on disks of the multi-protocol storage appliance is not typed; only "raw" bits are stored on the disks. The file system organizes those bits into vdisks and RAID groups across all of the disks within a volume. Thus, the created vdisk does not have to be explicitly configured because the virtualization system 300 creates a vdisk in a manner that is transparent to the user. The created vdisk inherits high-performance characteristics, such as reliability and storage bandwidth, of the underlying volume created by the file system.

As noted above, the multi-protocol storage appliance manages export control of vdisks by logical names through the use of initiator groups (igroups). A lun map command may be used to export one or more vdisks to the igroup, i.e., to make the vdisk(s) "visible" to the igroup. An example of an illustrative lun map command is:

lun map <path name><igroup> wherein the <path name> parameter is the path name to the lun to be mapped and the <igroup> parameter identifies an initiator group that should be mapped to the desired lun. In this sense, the lun map command is equivalent to an NFS export or a CIFS share, i.e., the WWN addresses or iSCSI IDs identify the clients that are allowed to access the vdisk identified by the pathname. Thereafter, the logical name igroup is used with all operations internal to the storage operating system. This logical naming abstraction is pervasive throughout the entire lun and igroup command sets, including interactions between a user and the multi-protocol storage appliance. In particular, the igroup naming convention is used for all subsequent export operations and listings of luns that are exported for various SAN clients.

To undo a mapping, the storage operating system provides a lun unmap command that disassociates an igroup from a lun. An example of a lun unmap command is:

lun unmap <path name><igroup> wherein the <path name> parameter identifies the path name to the lun to be unmapped and the <igroup> parameter identifies the igroup that is to be disassociated with the lun. After execution of a lun unmap command, the lun will not be visible to initiators within the igroup.

A lun may be dynamically resized by the administrator using a lun resize command. An example of an illustrative lun resize command is:

lun resize <path name><size> wherein the <path name> parameter is the path name of the lun to be resized and the <size> parameter identifies the new size of the lun. In the exemplary embodiment, a size may be denoted using a variety of suffixes to the numerical identifier including, for example b (bytes), k (kilobytes), m (megabytes), g (gigabytes) or t (terabytes). In the illustrative embodiment, the lun resize command changes the size of the lun that is reported by the storage appliance to clients. Host applications, executing on the clients, then manage the size change once the storage appliance has reported the change.

A lun may also be deleted (destroyed) by an administrator through the use of a lun destroy command. A lun destoy command deletes the underlying file embodying the lun from the fils system. An exemplary lun destroy command is:

lun destroy <path name> wherein the <path name> parameter identifies the path name of the lun to be deleted (destroyed). Upon execution of the lun destroy command, the storage operating system removes the vdisk from the file system.

To briefly summarize the operation of the CLI, the igroup and lun commands are provided to enable a user/system administrator to create, delete and maintain igroups and luns. An administrator first generates an igroup, which is a mapping of one or more initiator WWNs or iSCSI IDs to a logical human-friendly name. A user may then create a lun or vdisk through the use of the lun create command. The administrator, using the lun map command, then maps the created lun to the igroup so initiators within the igroup may access the lun. Once the lun has been created, an administrator may utilize the lun resize command to grow or shrink the size of the lun to meet changing system needs. If an igroup no longer requires access to a lun, the igroup may be disassociated with the lun through the use of the lun unmap command. Finally, if a lun is no longer needed, it may be deleted through the use of the lun destroy command.

Graphical User Interface

The GUI 354 may be implemented on the multi-protocol storage appliance to allow a user or administrator easy access to the management functionality contained in the vdisk/igroup command set. By providing a GUI, in addition to the CLI commands, the multi-protocol storage appliance may be initialized with fewer references to manuals and/or other aids for the administrator. Additionally, the GUI may provide additional graphical and/or tabled reporting data that is not available via CLI. Such consolidated reporting is further described in U.S. patent application Ser. No. 09/862, 949, entitled SYSTEM AND METHOD FOR CONSOLIDATED REPORTING OF CHARACTERISTICS FOR A GROUP OF FILE SYSTEMS by Brian M. Hackworth, the contents of which are hereby incorporated by reference.

The GUI provides an alternative to the CLI for executing lun management commands. Additionally, the GUI may be easier to use for inexperienced system administrators and may enable faster initialization of luns by removing the need to reference manuals for specific commands. The GUI may be implemented in a variety of environments including, for example, a Microsoft Windows environment, a X-Window based workstation environment, or other graphical user interface system environment. Alternatively, the GUI may be accessed through a browser via the World Wide Web.

In one embodiment, the GUI converts a series of menu options or other graphical interactions into a CLI command which is then executed using, for example, remote shell (RSH) technology. In other embodiments, the GUI includes appropriate conventional program code to directly generate file system primitives for performing requested actions. For example, a Java Virtual Machine (JVM) 370 (shown in FIG. 3) may include a number of servlets 375 that interface with the GUI 354 of the UI 350. The servlet 375 may implement the various user interface functionality described below by, for example, generating HTML pages "on-the-fly" for display at a remote location via the World Wide Web. The servlet may communicate directly with the HTTP layer 224 of the storage operating system to send HTML requests and receive user selections. In alternate embodiments, the creation of GUI web-based pages may be accomplished using other techniques of dynamic remote graphical user interface techniques including, for example, dynamic HTML (DHTML), Flash technology or the like. In the illustrative embodiment, however, the GUI provides a series of "wizards" that "walks" a user through the creation of or performance of certain tasks.

Figure 7:
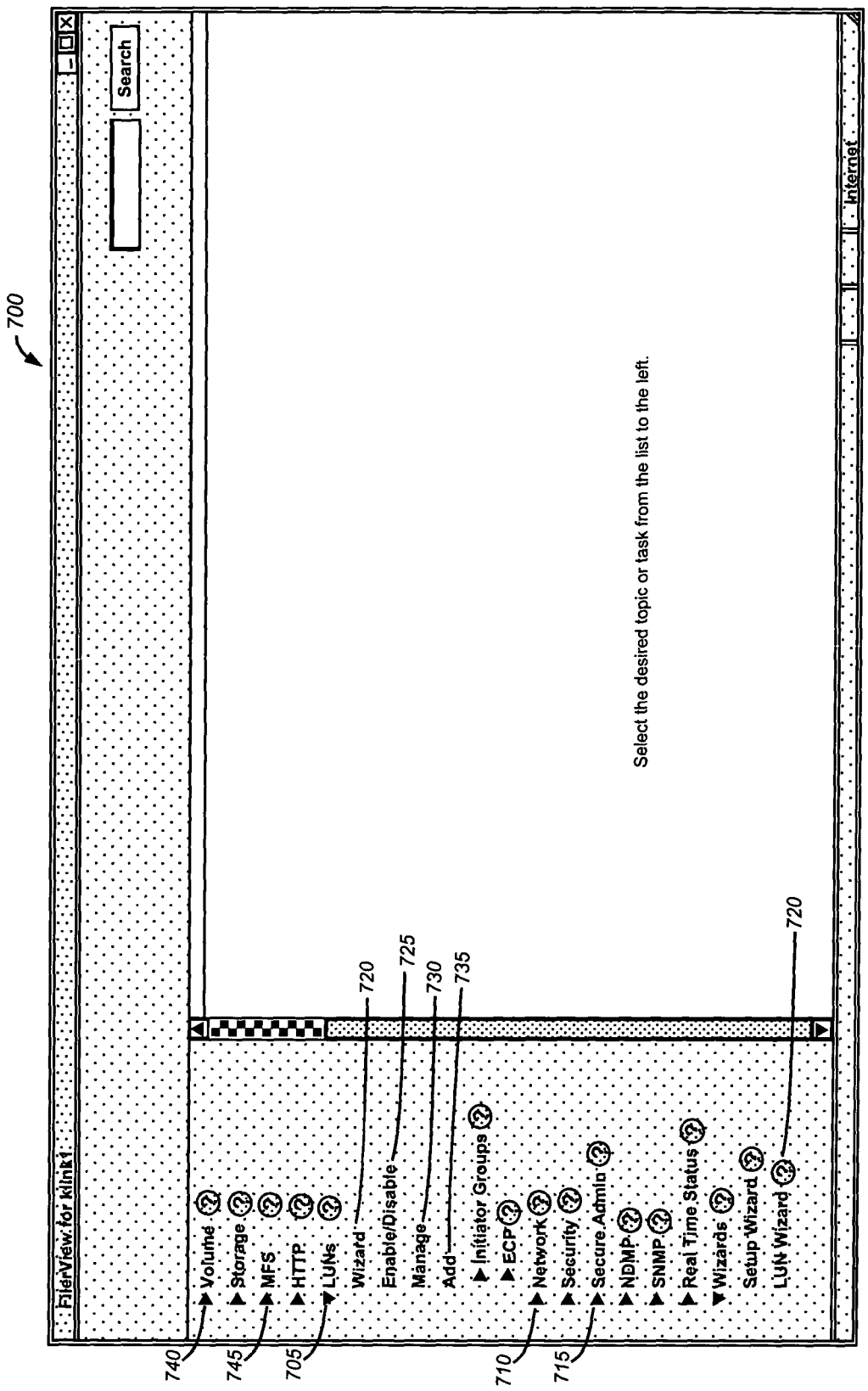
FIG. 7 is a view of a graphical user interface (GUI) window showing the lun wizard button in accordance with an embodiment of the present invention.

FIGS. 7–17 illustrates exemplary GUI windows pertaining to a lun wizard according to the present invention. Specifically, FIG. 7 illustrates a variety of buttons located along the left-hand side of the GUI window 700. A luns drop down menu button 705 may be activated to display, various buttons including a wizard button 720, an enable/disable button 725, a manage button 730 and an add button 735. The add button 735 further includes buttons for adding an initiator group 710 or an FCP connection 715. The lun wizard button 720 permits the activation of a lun creation wizard. By clicking on or otherwise activating any of these buttons, the GUI will display (bring up) an associated screen or screens to permit the user to perform the desired task as described below. Similarly, the GUI window 700 includes drop down menus for volume 740 and NFS management 745.

Figure 8:
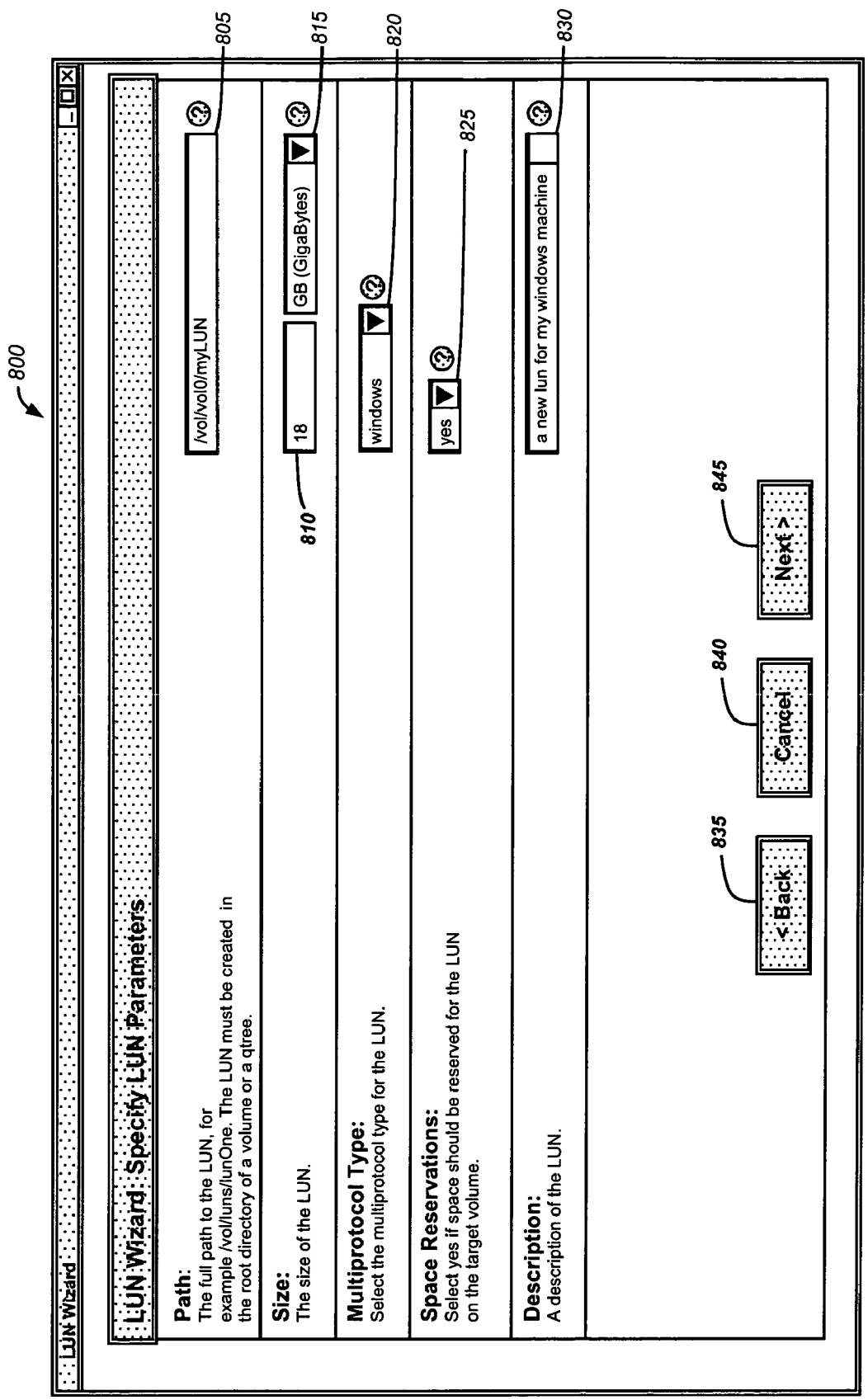
FIG. 8 is a view of a GUI window for specifying lun parameters in accordance with an embodiment of the present invention.

By clicking on or otherwise activating the lun wizard button 725, wizard windows are displayed that enable the administrator to create a lun and that map a lun to an igroup. FIG. 8 illustrates a lun window 800 that permits the administrator to specify lun parameters via a variety of menu options including a field for entering a path 805 as well as fields for selecting a size (810) and size multiplier (815) of the lun. The menu options further include fields for entering the protocol type 820, whether the lun should be space reserved 825 and a description of the lun 830. Additionally, the window provides a series of menu buttons including a back button 835, a cancel button 840 and a next button 845.

The path entry option 805 permits the administrator to enter a full path description to the lun by, for example, entering a fully qualified path name. A user may enter a size (in digits) in field 810 and also select a multiplier in field 815. The field multiplier 815 may be kilobytes (KB), megabytes (MB), or gigabytes (GB). Moreover, the user may specify the exact size of the lun to be created. For example, a user may create a 15 GB lun by entering "15" into field 810 and selecting "GB" from menu field 815. The multi-protocol type entry field 820 permits a user to select the type of protocol for accessing the lun. Examples of protocol types include Microsoft Windows, a Unix/Linux-based protocol or a disk image.

Selection block 825 allows a user to enable space reservations for the particular lun. As the vdisk representing the lun typically is not physically written to disk when it is created, there is a possibility that additional write operations may occur to the disks, which result in an inadequate amount of space on the physical disks to store the complete vdisk. In such a situation, "no space" errors could be returned to users of the lun. As most block access devices are not programmed to deal with no space errors, data loss may occur. By enabling space reservations, appropriate entries in the file system store the vdisk so that an adequate amount of space is reserved to enable the vdisk to be completely rewritten to the physical disks. Space reservations are further described in U.S. patent application Ser. No. 10/423,391, entitled SYSTEM AND METHOD FOR SPACE RESERVATIONS, by Peter Corbett, et al., the contents of which are hereby incorporated by reference.

The description field 830 enables a user or administrator to enter a brief description of the lun. For example, the user may enter a description of the purpose of the lun, such as "Accounting Data." Finally, the series of menu buttons located at the bottom of the display window 800 allow a user to display a previous GUI window (back button) 835, cancel a pending operation (cancel button) 840 and proceed to a next GUI window (next button) 845 in the lun wizard.

Figure 9:
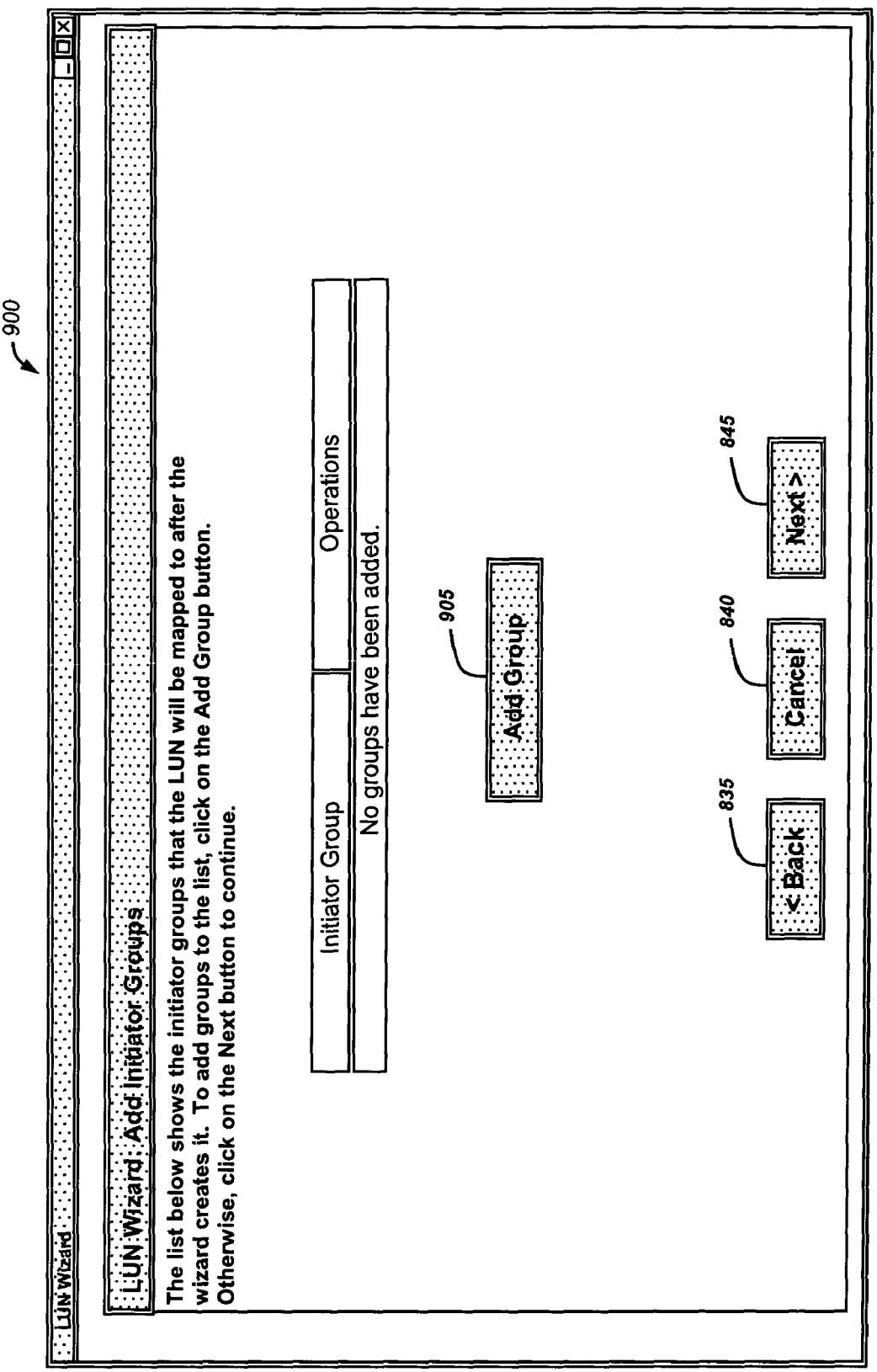
FIG. 9 is a view of a GUI window for adding initiator groups in accordance with an embodiment of the present invention.
Figure 10:
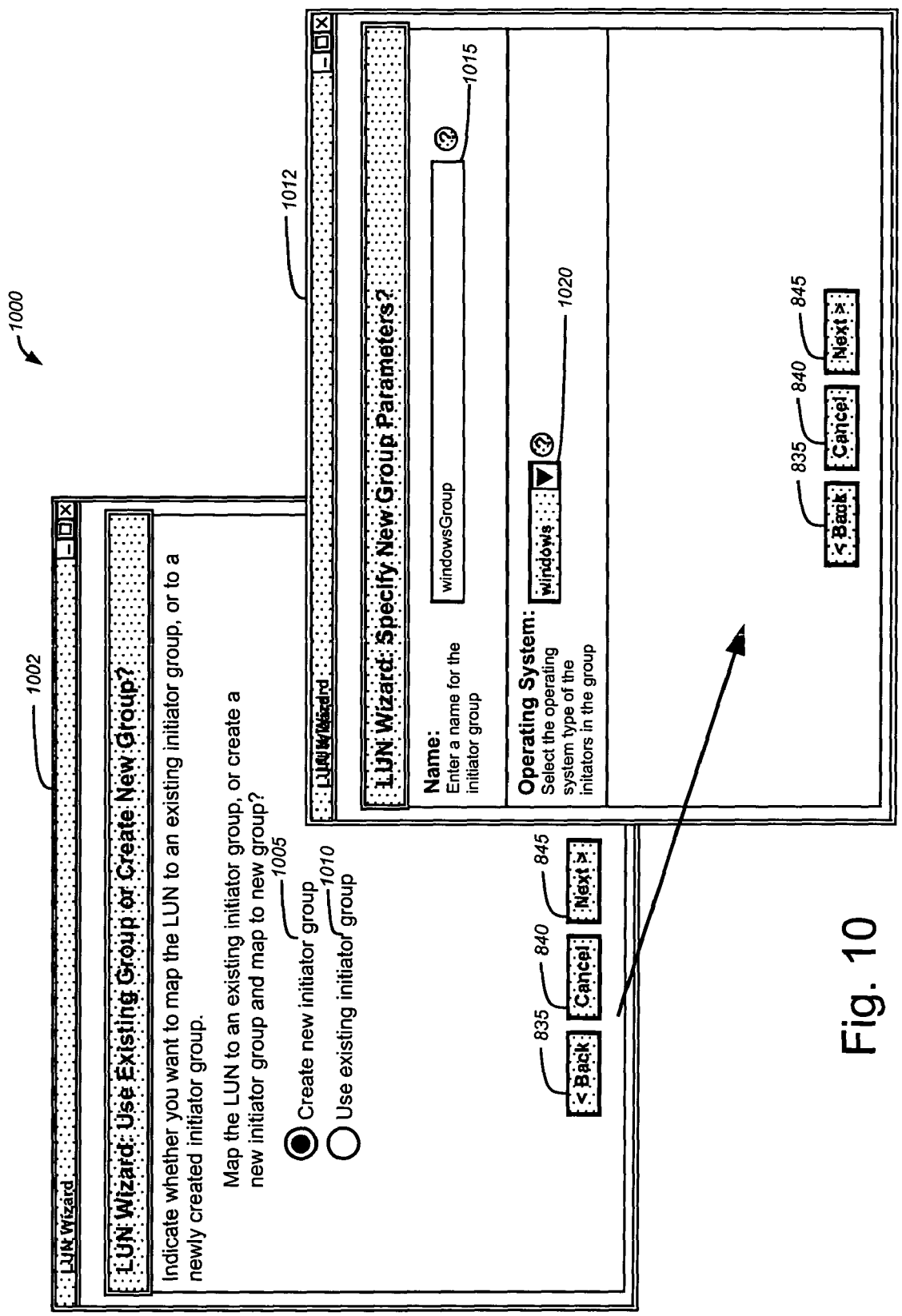
FIG. 10 is a view of a GUI window for adding new initiator groups in accordance with an embodiment of the present invention.

FIG. 9 is a GUI window 900 that enables selection of initiator groups to be associated with the lun created via the exemplary wizard. The window 900 includes a button 905 for adding an initiator group along with back 835, cancel 840, and next 845 buttons as described above. In response to activating the add igroup button 905, the GUI proceeds to a next window 1000 shown in FIG. 10 that includes a first screen 1002 having buttons for creating a new initiator group 1005 and using an existing initiator group 1010. If the user selects creation of a new initiator group (button 1005), a second screen 1012 is displayed, which provides a first field 1015 for entering a name and a second field 1020 for selecting an operating system type for the initiators in the group e.g., the Windows operating system. The name field 1015 enables a user or an administrator to enter a name for the initiator group, for example "Windows Group."

Figure 11:
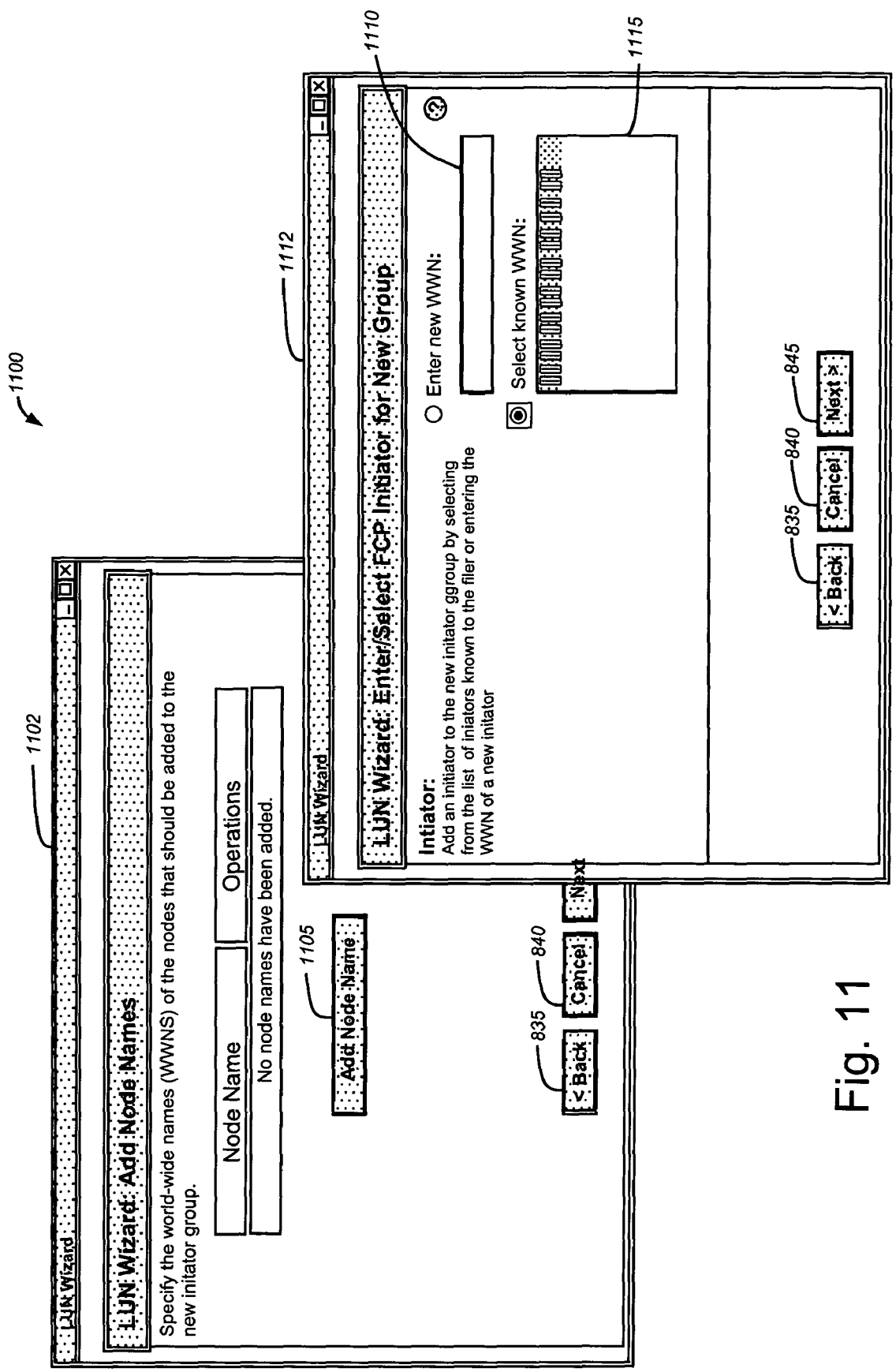
FIG. 11 is a view of a GUI window display for adding node names in accordance with an embodiment of the present invention.

Proceeding from the window 1000, the user then adds a set of worldwide names (WWN's) to the newly created igroup using a first screen 1102 of window 1100 as shown in FIG. 11. The user selects a button for adding a node name 1105, which then creates a second screen 1112 as shown in FIG. 11. The second screen 1112 includes entries for entering a new WWN (entry 1110) and for selecting a known WWN (entry 1115). The user may enter the WWN of a node or may select one or more initiators to be added to the newly created group from a menu in 1115. In an alternate embodiment, similar screens are utilized that enable the user or administrator to select or enter iSCSI IDs instead of FCP WWNs for addition to the initiator group. Similarly, in another alternate embodiment, screen 1112 may include options for adding both iSCSI IDs and FCP WWNs to an igroup.

Figure 12:
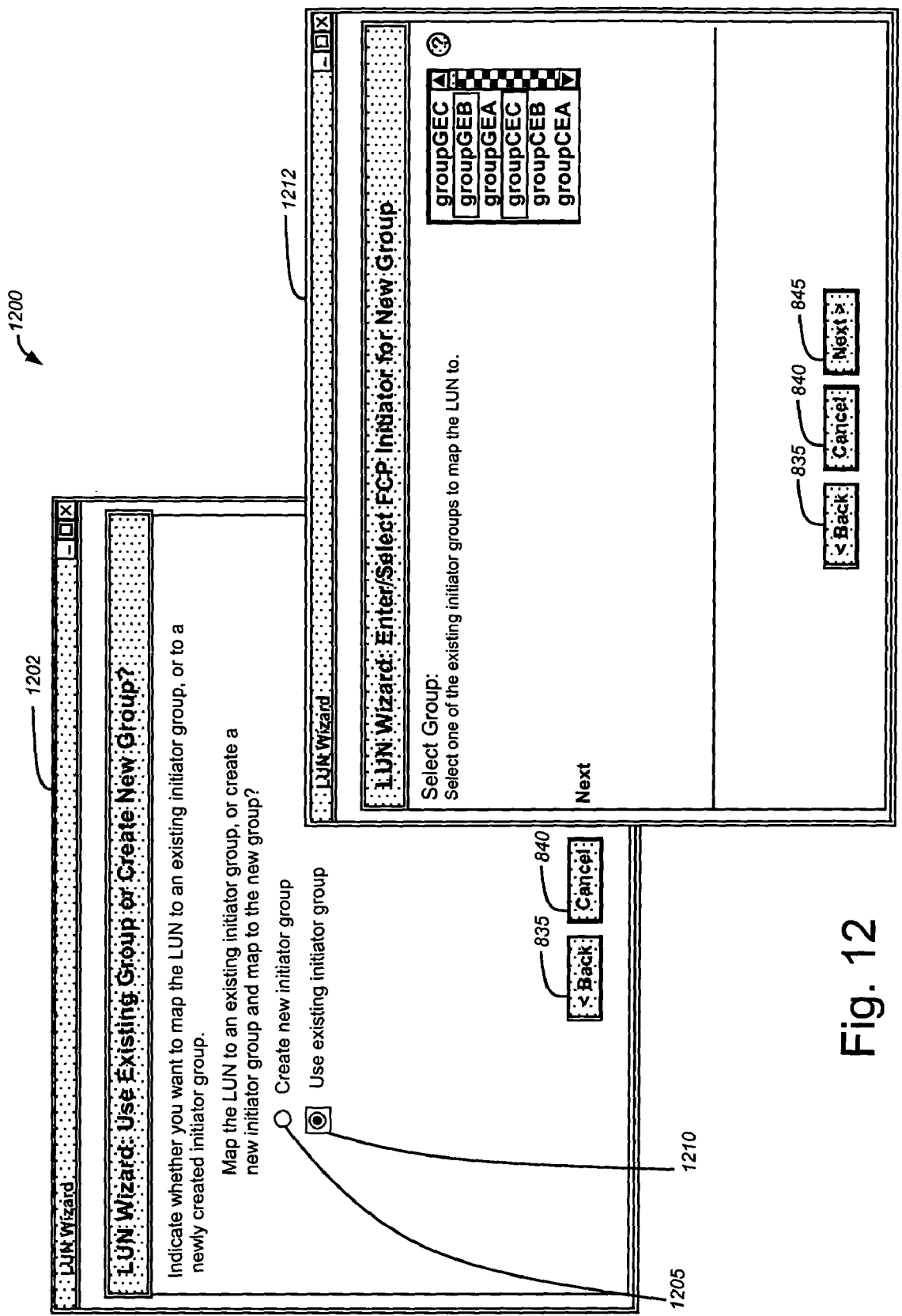
FIG. 12 is a view of a GUI window for selecting existing groups in accordance with an embodiment of the present invention.

FIG. 12 shows an exemplary GUI window 1200 with screens configured to show a series of options that enable an administrator to select an existing igroup to "bind" the lun being created. First screen 1202 illustratively includes two options for creating a new igroup 1205 and using an existing igroup 1210. If the administrator selects button 1210 to use an existing initiator group, the exemplary GUI displays a second screen 1212 including, in the illustrative embodiment, a selector menu 1215 from which the administrator may select one or more existing igroups to be bound to the one being created.

Figure 13:
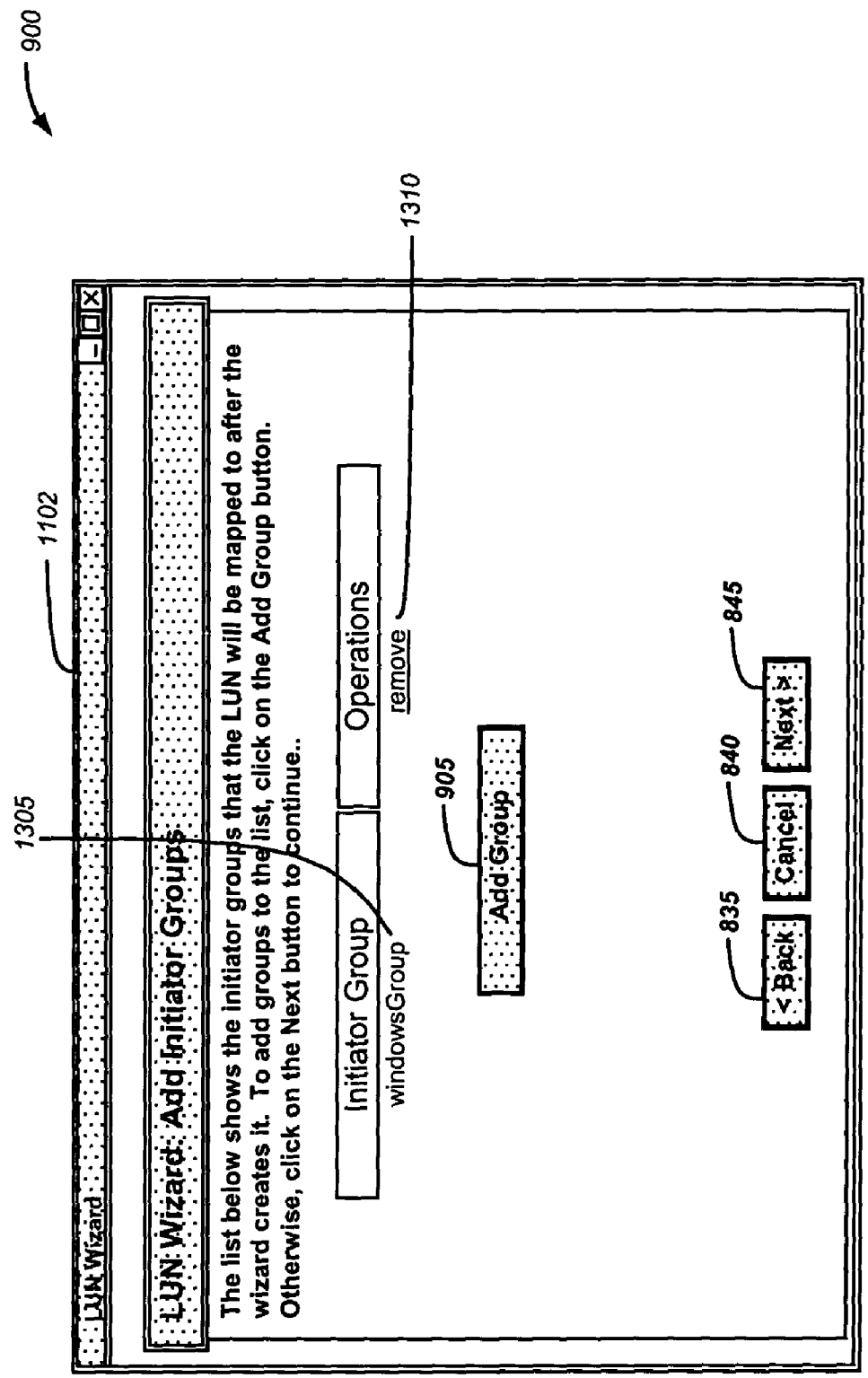
FIG. 13 is a view of a GUI window for adding initiator groups showing an initiator group present in accordance with an embodiment of the present invention.

FIG. 13 shows the exemplary "add initiator groups" window 900 (FIG. 9) that is extended to include a new button for removing the added igroup 1310. This feature of the invention allows a user (administrator) to remove an added igroup by clicking on the remove button 1310. By selecting either the add 905 or remove 1310 options, the administrator may create a set of igroups to be bound to the lun being created. In accordance with the illustrative embodiment, multiple igroups may be bound to a single lun.

Figure 14:
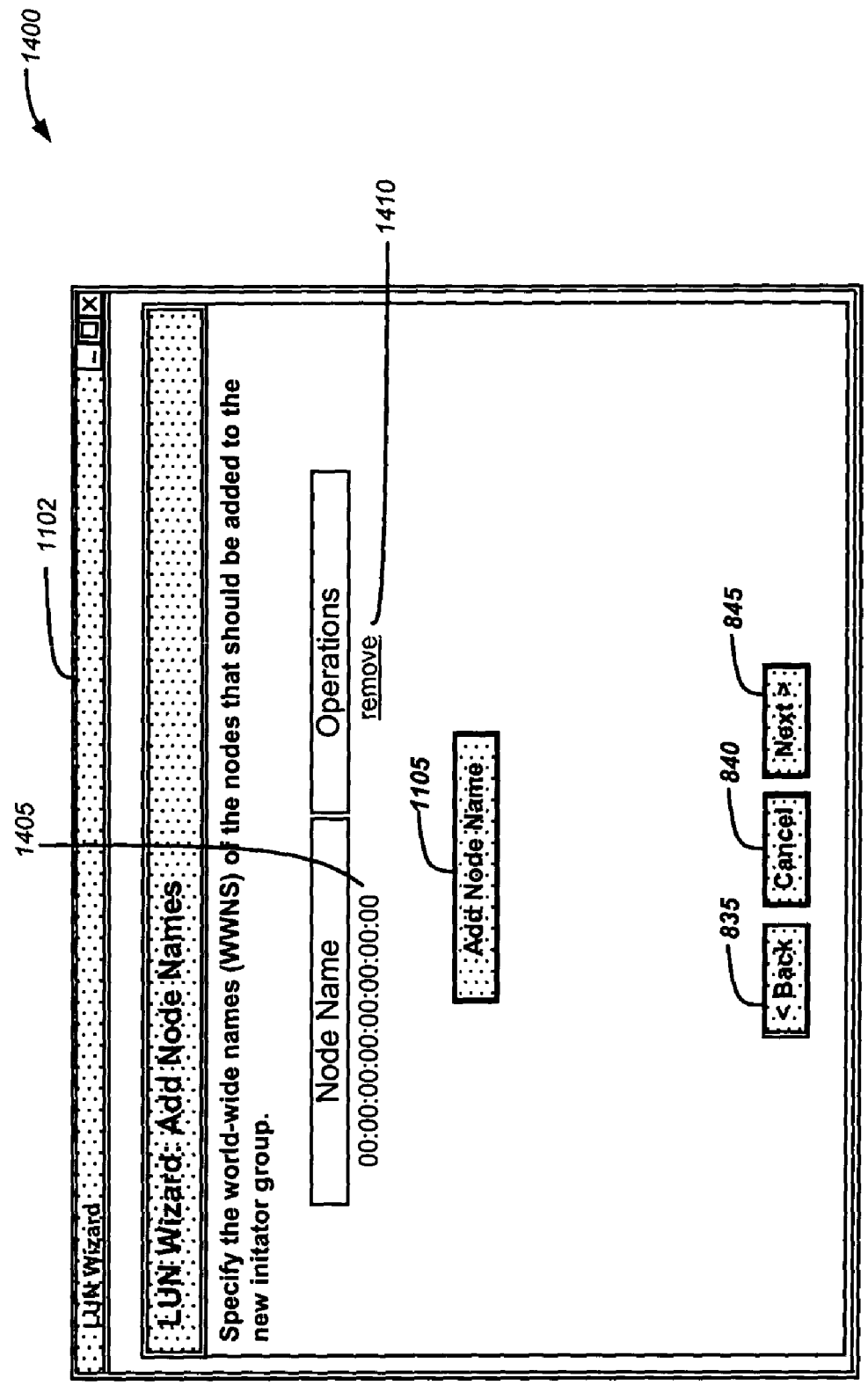
FIG. 14 is a view of a GUI window for adding node names with a node name present in accordance with an embodiment of the present invention.

FIG. 14 illustrates the "add node names" window 1100 (FIG. 11) with an exemplary added node name. Node names that have been added, such as node name 1405, are displayed on screen 1102 along with a button 1410 that provides an option of removing the node name from the igroup. The screen 1102 includes a button 1105 for adding additional node names.

Figure 15:
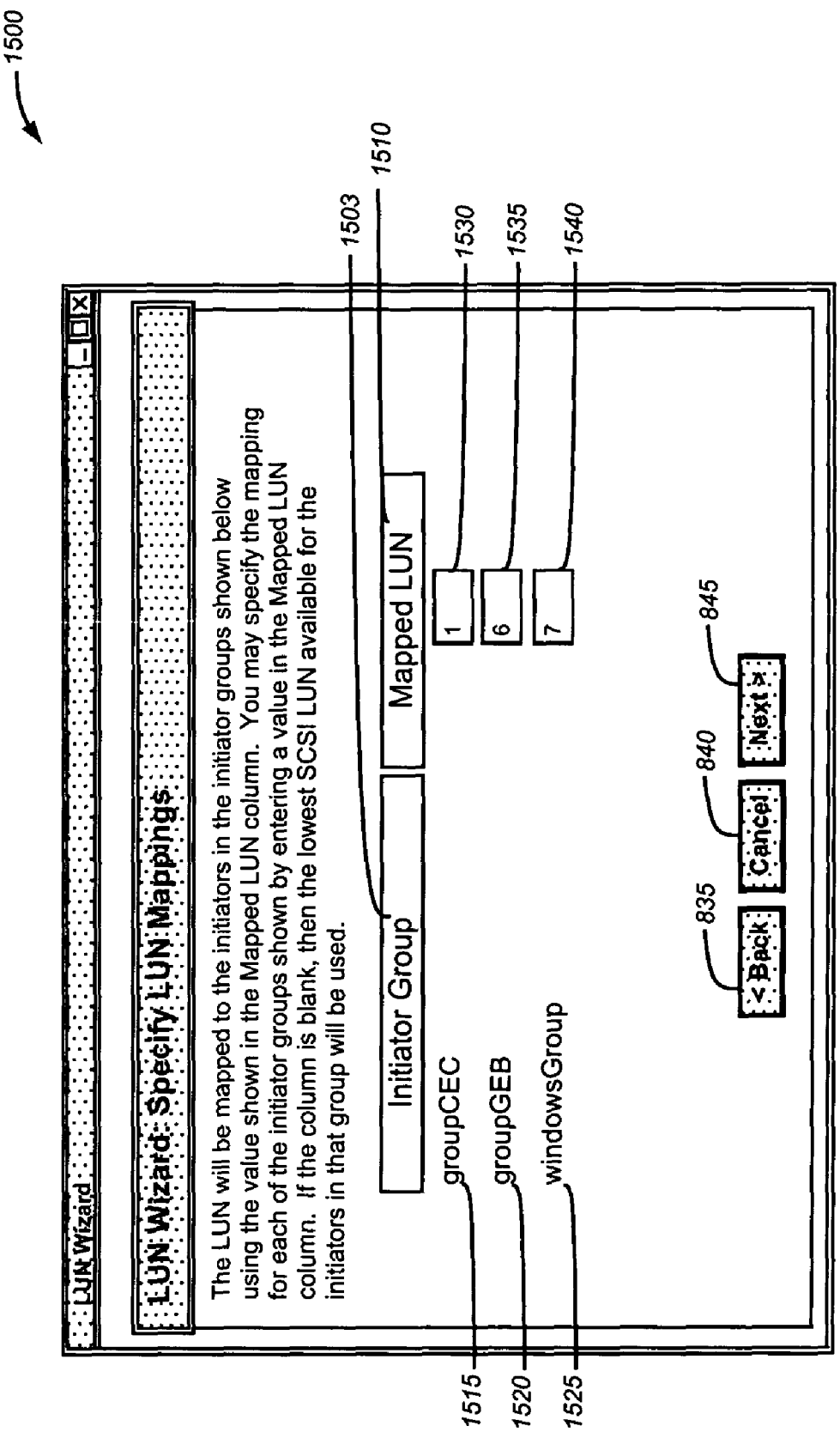
FIG. 15 is a view of a GUI window for specifying lun mappings in accordance with an embodiment of the present invention.

FIG. 15 is an exemplary GUI window 1500 for specifying lun mappings of igroups associated with the lun. The exemplary GUI window 1500 includes an initiator groups column field 1505 and adapted to display a column of initiator groups and a mapped lun column field 1510 adapted to display mapped lun values 1510. For example, the group "groupCEC" displayed in entry 1515 is mapped to lun number 1 (entry 1530). Similarly, the "Windows Group" displayed in entry 1525 is mapped to lun number 7 (entry 1540). In the illustrative embodiment, if a user leaves an entry under the mapped lun field 1510 to empty, then the lowest SCSI lun value that is available for the initiators in the group is used as a default lun value.

Figure 16:
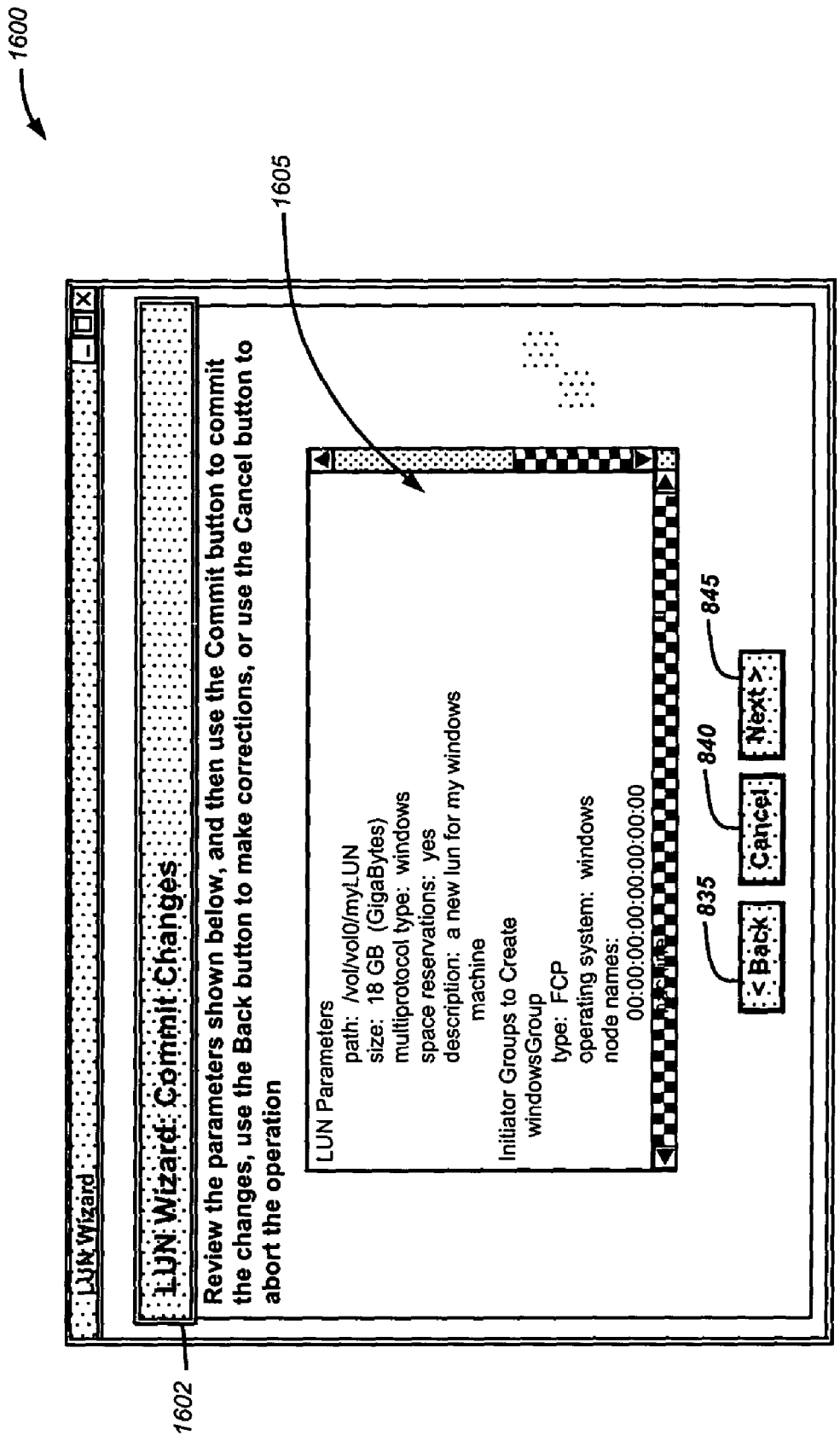
FIG. 16 is a view of a GUI window for committing changes in a lun wizard in accordance with an embodiment of the present invention.

FIG. 16 is an exemplary "commit changes" window 1600 showing confirmation before creating the lun, associated igroups and mappings. The exemplary window presents a user with a final chance to agree to the entered changes or cancel the operation. The window includes a display box 1605 containing all of the entered data and configuration information for the lun and/or igroups to be created. It should be noted that in this exemplary window, the forward button 845 has been modified to read "Commit." Thus, a user desiring to move forward in the lun/igroup creation process instructs the storage operating system to commit these changes by forming the appropriate low-level file system primitives to generate and bind the desired igroups, create the lun at the specified location and map the newly created lun to the specified igroups.

Figure 17:
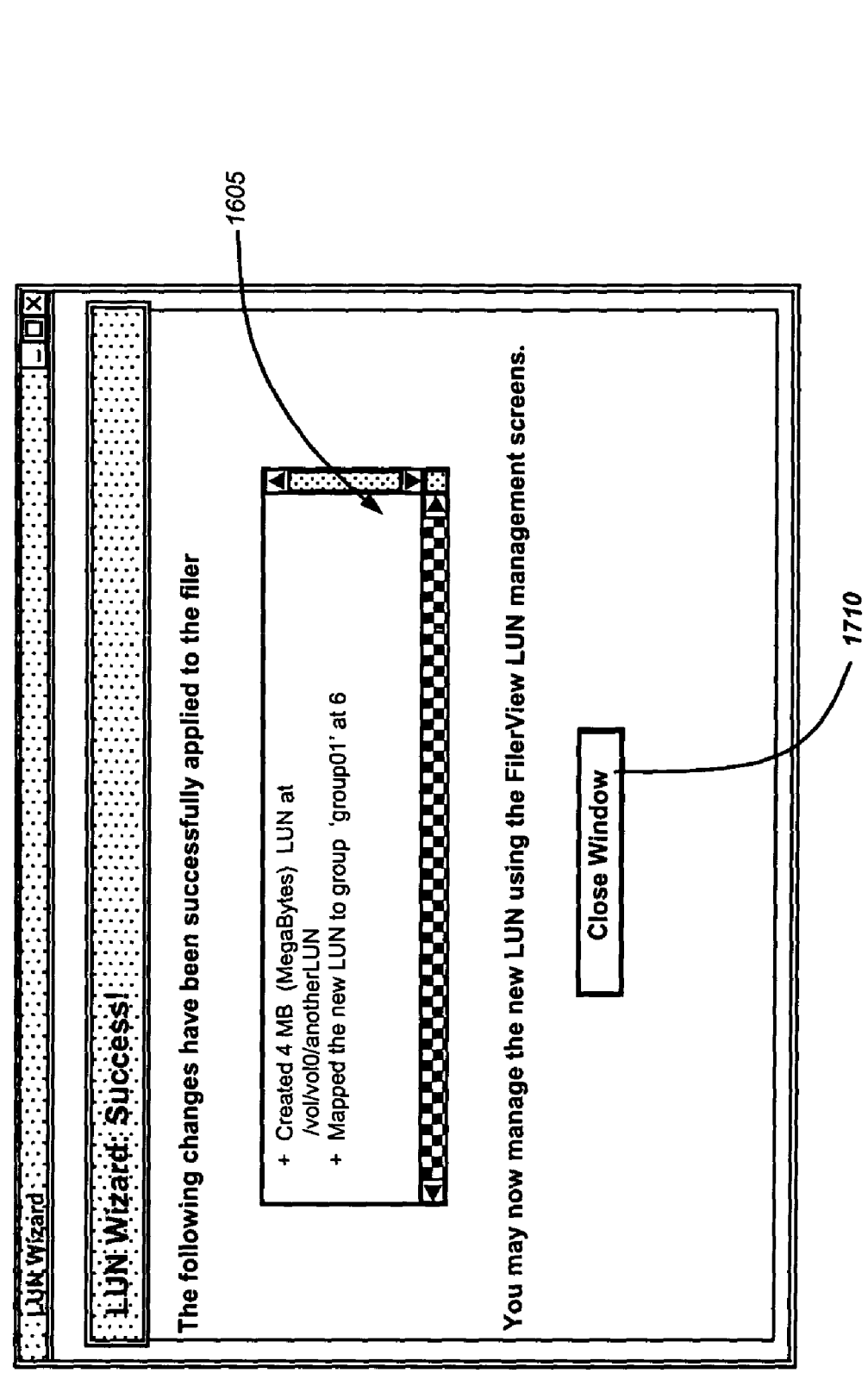
FIG. 17 is a view of a GUI window showing successful changes in accordance with an embodiment of the present invention.

FIG. 17 is an exemplary "results" window 1700 showing a confirmation of the actions of the lun wizard. Included within window 1700 is a display box 1705 showing the actual results of an operation. In this example, a 4 MB lun was created at "/vol/vol 10/another lun" and has been mapped to the group "group01" at lun value 6. Also included within the exemplary window 1700 is a close window button 1710.

Figure 18:
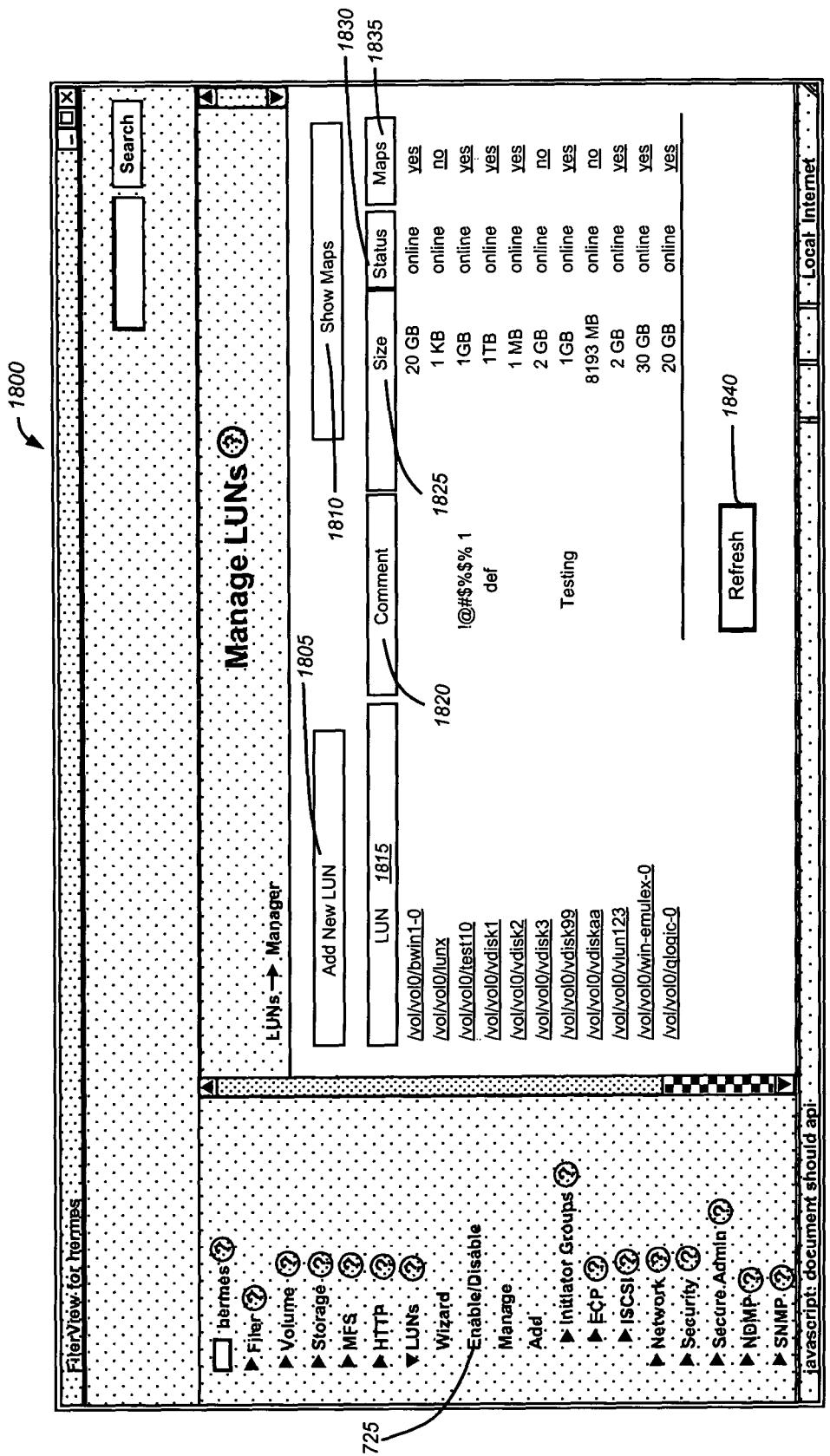
FIG. 18 is a view of a GUI window for managing luns in accordance with an embodiment of the present invention.

FIG. 18 is an exemplary "management display" window 1800 for maintaining and managing luns associated with the storage system 100. In the illustrative embodiment this exemplary window may be accessed via, for example, the World Wide Web (WWW) at a location remote from the actual storage system. Thus, the GUI permits an administrator to remotely manage and control lun creation, deletion and/or, mappings. Along the left hand side of the window 1800 is a list of commands including, for example, an enable/disable option 725 for enabling or disabling luns associated with the storage system. Menu options are provided for adding new luns 1805 and for showing lun mapping information 1810. The window 1800 also includes columns of management information such as a listing of luns field 1815, a comment field 1820, a size of each lun field 1825, the status of each lun field 1830 and a field indicating whether the lun is currently mapped 1835. The luns column field 1815 lists all luns associated with the storage system. The comment field 1820 allows the administrator to enter a description of the lun.

Figure 19:
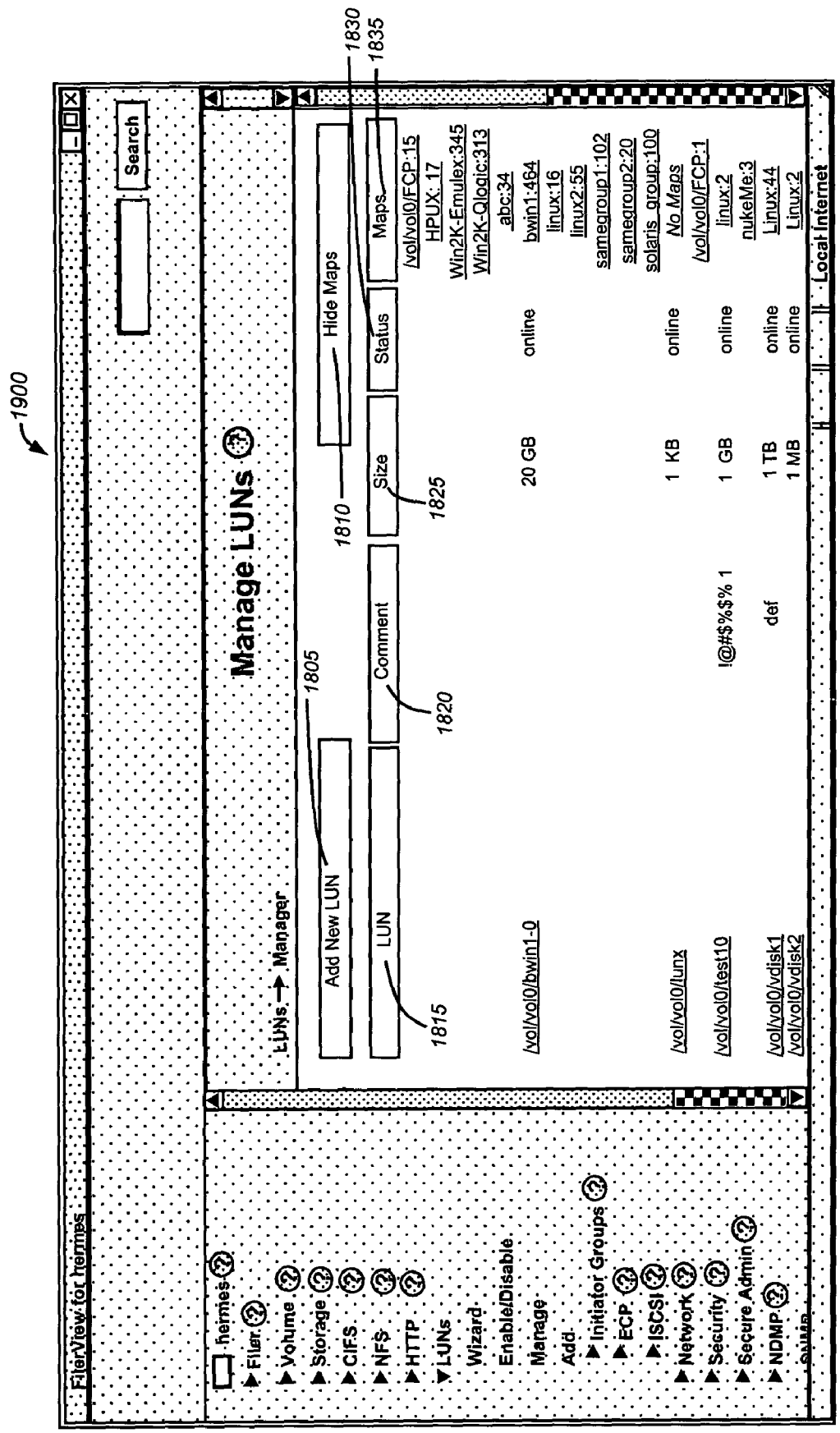
FIG. 19 is a view of a GUI window for managing luns showing lun mappings in accordance with an embodiment of the present invention.

FIG. 19 is an exemplary GUI window 1900 showing data of FIG. 18 after a user has activate the showmaps button 1810. Each lun in column 1815 is shown with all of the associated mappings in column 1835. The size field 1825 shows the size of each lun, while the status entry 1830 shows whether the lun is online or offline. As used herein, "online" denotes that the lun is currently active and may be accessed for data storage. Similarly, a lun is "offline" if it is inaccessible to users. The maps entry 1835 shows whether a particular lun has been mapped to one or more initiator groups.

Figure 20:
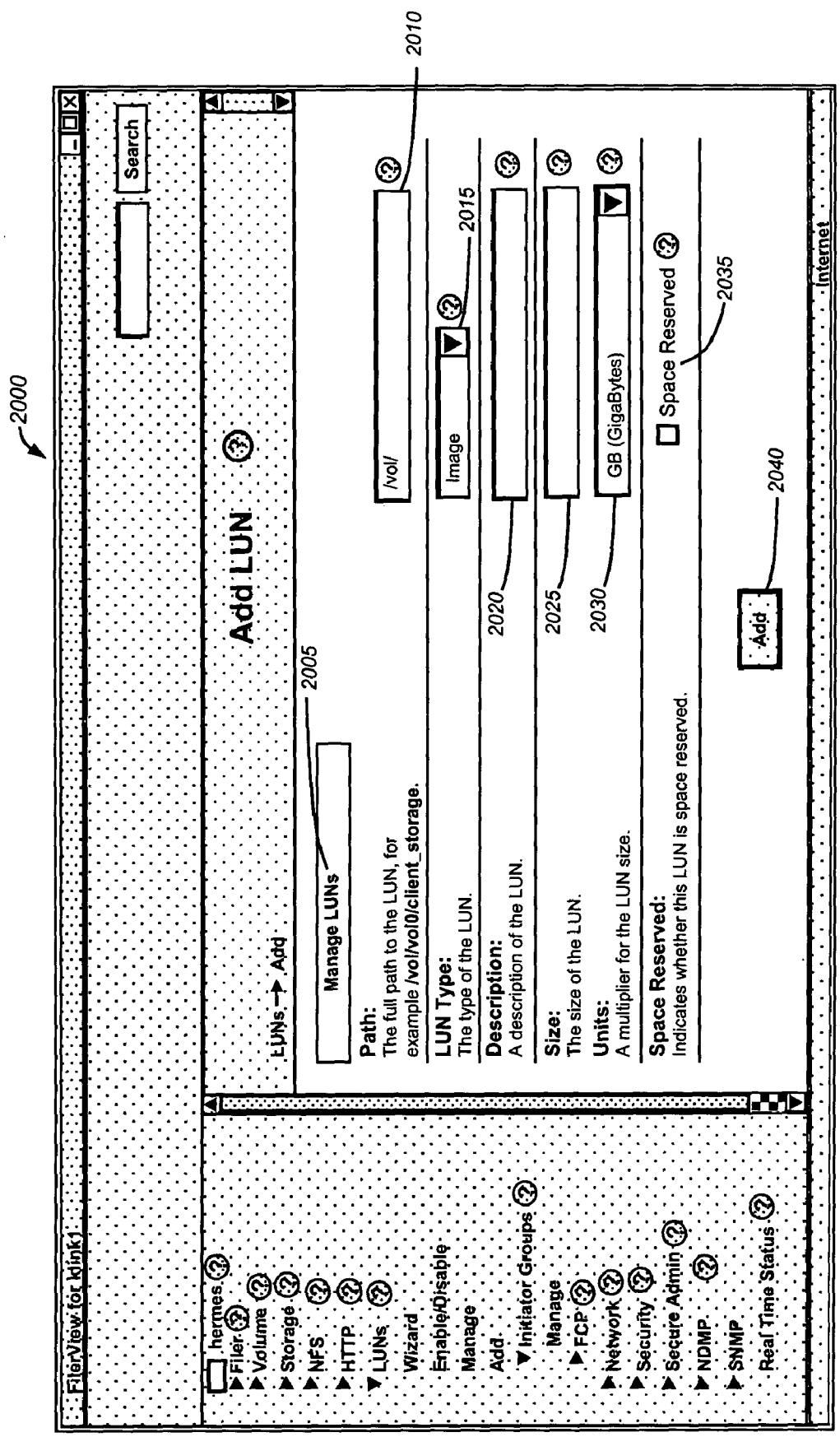
FIG. 20 is a view of a GUI window for adding a lun in accordance with an embodiment of the present invention.

FIG. 20 illustrates an exemplary GUI window 2000 for adding a new lun. The window 2000 includes a button to manage luns 2005 along with a series of fields 2010–2035 for entering data needed to create the lun. These fields include a field 2010 to enter the full path for the lun, a drop down menu selector 2015 for identifying and selecting the lun type and a field 2020 to enter a description for the lun. The size of the lun (field 2025) and a size multiplier (field 2030) may also be selected by the user. Additionally, a user may select whether space reservations are active or not for the lun by clicking on a space reserved button 2035.

Figure 21:
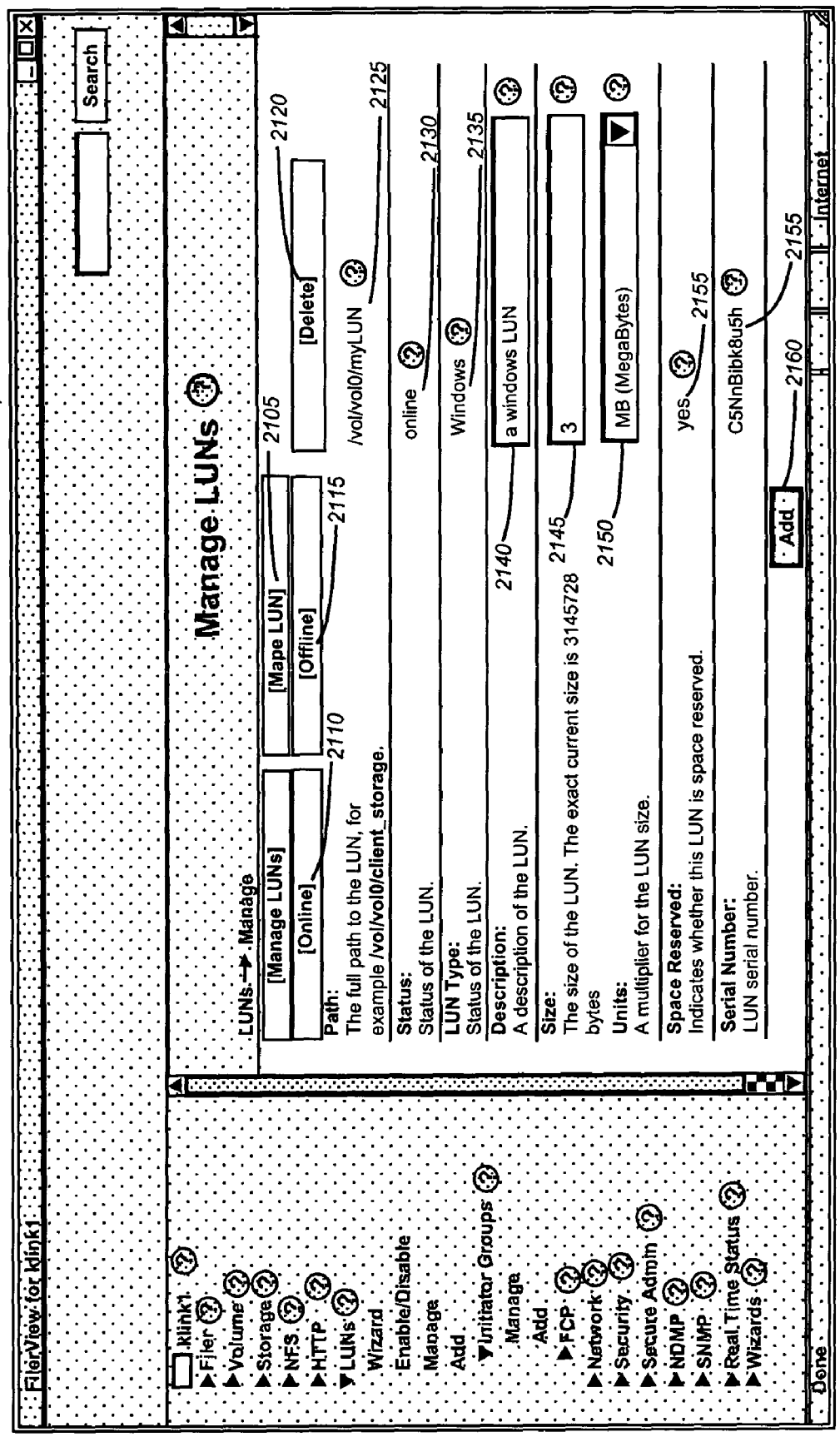
FIG. 21 is a view of a GUI window for managing a lun in accordance with an embodiment of the present invention.

FIG. 21 is an exemplary GUI window 2100 for use in managing luns in accordance with an embodiment of the present invention. The exemplary window 2100 permits a user to manage a specified lun. A series of menu options along the top including, a map lun button 2105, online button 2110, offline button 2115 and delete button 2120 provide large scale control. For example, selecting map lun button 2105 permits a user to map the specified lun to one or more igroups. Similarly, the online 2110 and offline 2115 buttons either activate or deactivate the lun by putting it into the appropriate state, while the delete button 2120 permits the administrator to delete the specified lun. Also included within the window 2100 are a path 2125 showing the fully qualified pathname to the lun, along with the status (online or offline) of the lun 2130. A description field 2140 allows entering of a description of the lun, whereas size and multiplier fields 2145 and 2150 permit the administrator to resize the lun to a specified size. Additionally, the display window 2100 shows whether the lun is space reserved (field 2155) and the serial number of the lun (field 2155).

Figure 22:
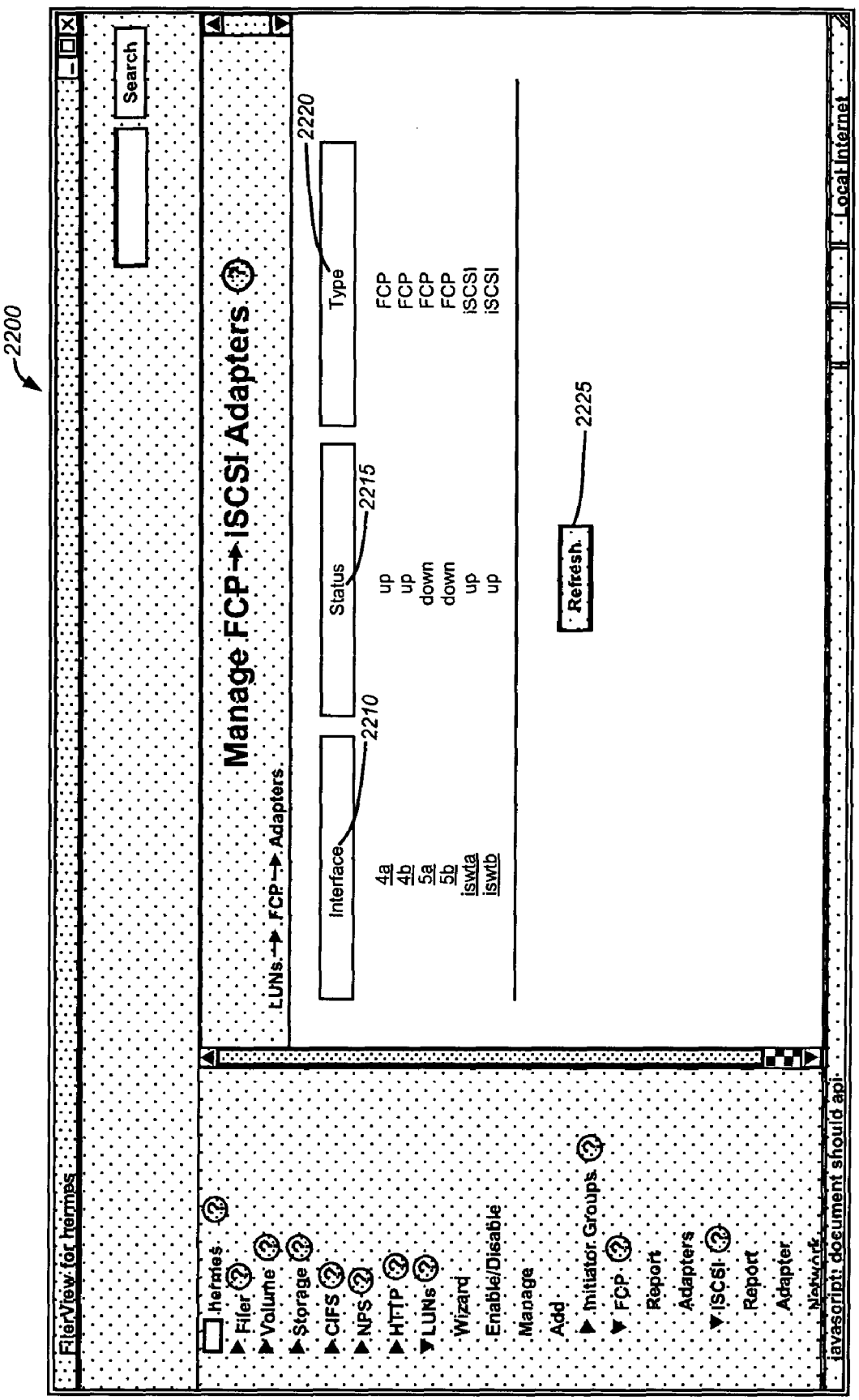
FIG. 22 is a view of a GUI window for managing FCP/iSCSI adapters in accordance with an embodiment of the present invention.

An exemplary GUI window 2200 for managing FCP/iSCSI adapters is shown in FIG. 22. The window 2200 includes three columns of information including, for example an interface column 2210, a status column 2215 and a type column 2220. The interface column 2210 displays all of the FCP or iSCSI adapter interfaces connected to the storage system. The corresponding entry in the status column 2215 shows whether the interface is "up" or "down". By "up" it is meant that the interface is currently active and being used for data transmissions. The type column 2220 identifies whether the interface is an FCP or ISCSI interface.

Figure 23:
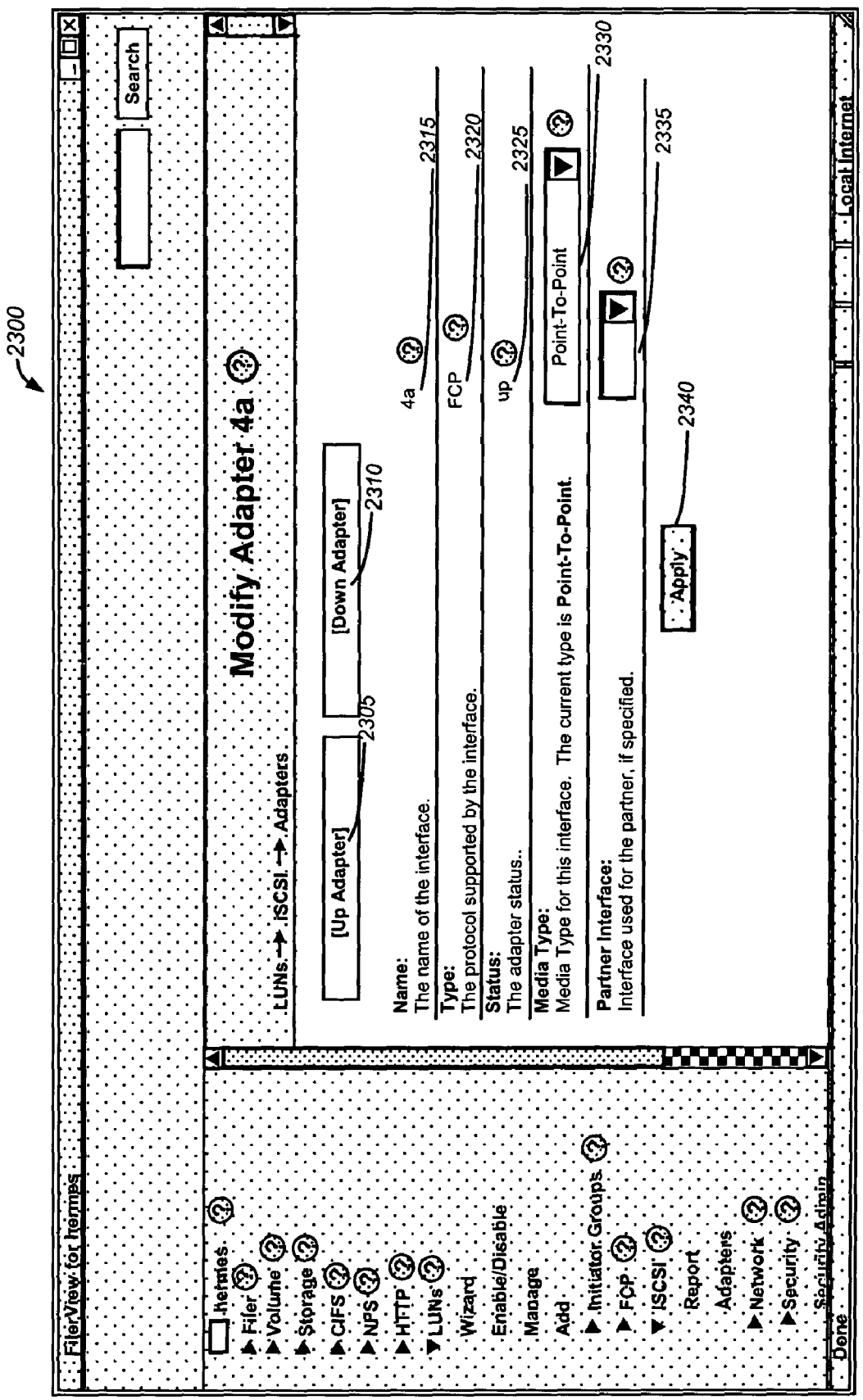
FIG. 23 is a view of a GUI window for modifying an adapter in accordance with an embodiment of the present invention.

An exemplary GUI window 2300 for modifying an adapter is shown in FIG. 23. The window 2300 includes buttons for moving up (button 2305) and down (button 2310) among adapters listed in FIG. 22. The window 2300 also includes options or displays showing the name 2315 of the adapter being modified, the type 2320 of protocol supported by this adapter and the status 2325 of the adapter. The modifying adapter window 2300 also includes options which enable the user to select the media type (option 2330) for the interface as well as permit a user to select the type of the interface used by a partner (option 2335). A "partner" may be, for example, another storage appliance configured in a cluster with the storage system being managed.

Figure 24:
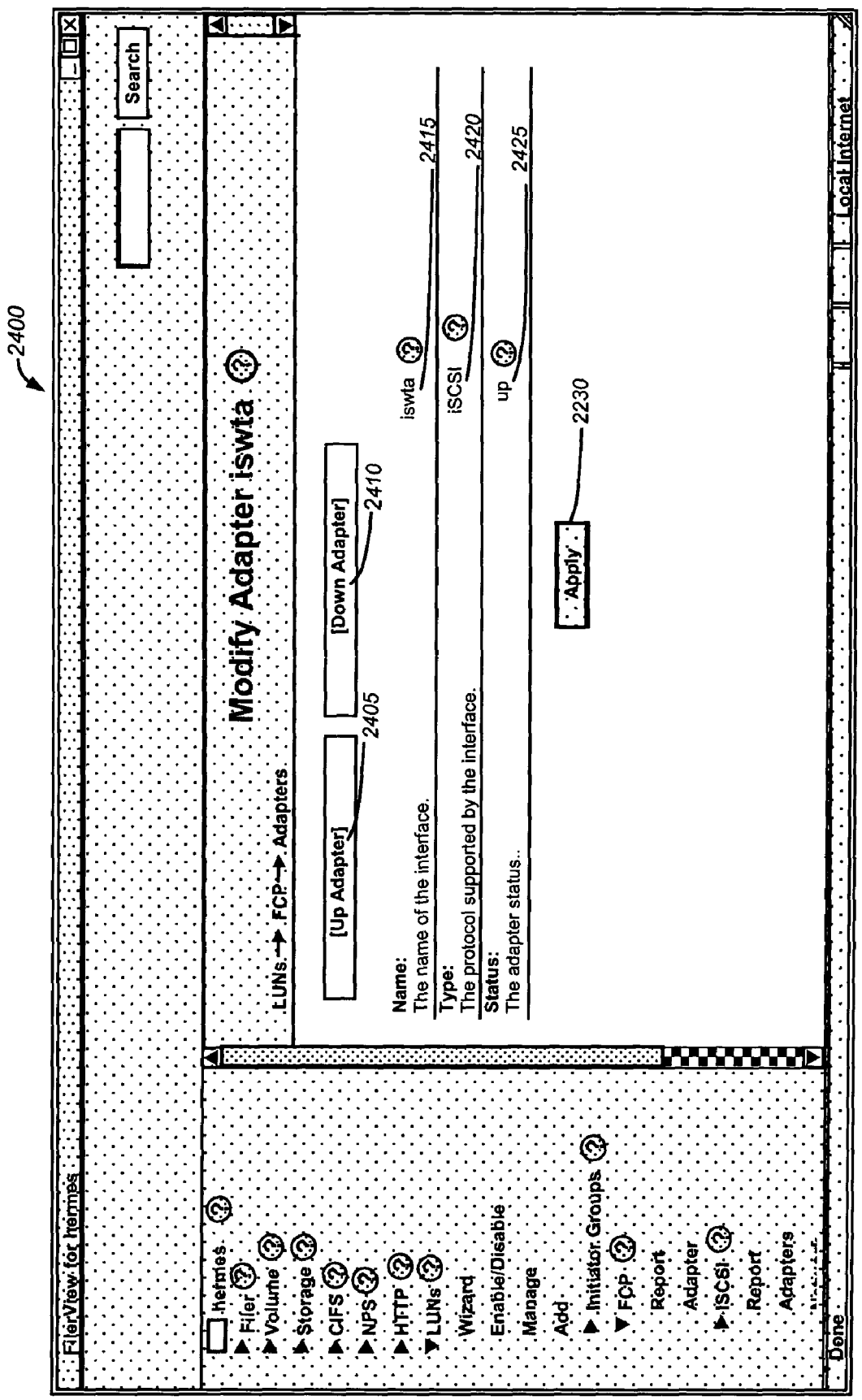
FIG. 24 is a view of a GUI window for modifying an adapter in accordance with an embodiment of the present invention.

FIG. 24 is an exemplary GUI window 2400 configured to modify an FCP adapter in accordance with an embodiment of the present invention. The window 2400 includes buttons for moving up (button 2405) and down (button 2410) a list of adapters. Additionally, the window includes display information identifying the name of the adapter (option 2415), the type of the adapter (option 2420) and the status of the adapter (option 2425).

Figure 25:
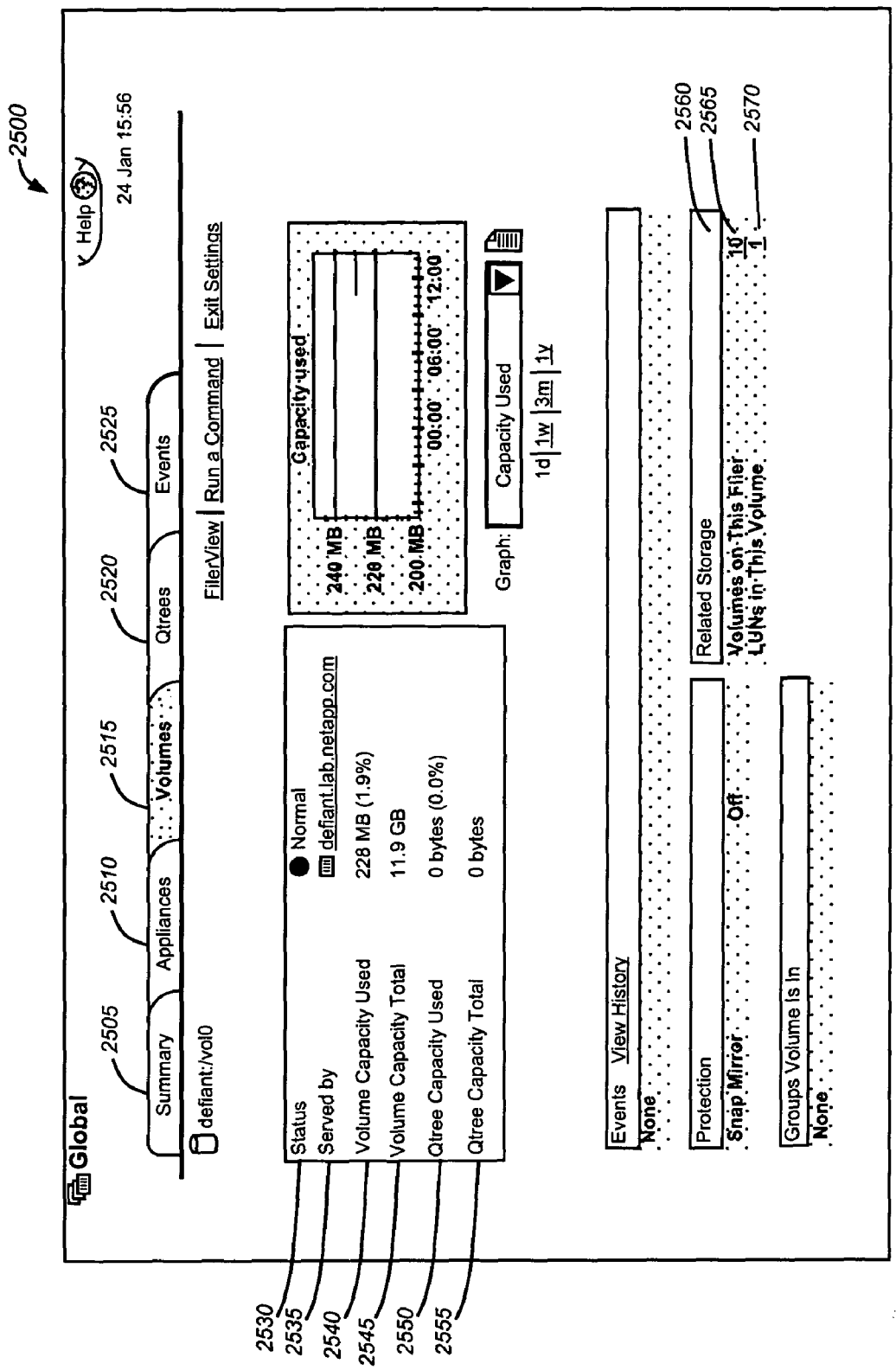
FIG. 25 is a view of a GUI window showing consolidated data reporting including lun information in accordance with an embodiment of the present invention.

FIG. 25 shows a GUI window 2500 that displays information relating to a volume in accordance with an embodiment of the invention. Along the top of the window 2500 is a row of tabs including a summary tab 2505, an appliances tab 2510, a volumes tab 2515, a qtress tab 2520 and an events tab 2525. The information displayed on window 2500 is further described in U.S. patent application Ser. No. 10/234,621 entitled SYSTEM AND METHOD FOR CONOSOLIDATED REPORTING OF CHARACTERISTICS FOR A GROUP OF DIRECTORIES, by Brian M. Hackworth, the contents of which are hereby incorporated by reference. In window 2500, the volumes tab 2515 is selected to display information relating to volume "vol0" including "status" 2530, the physical storage system serving the volume 2535, "volume capacity used" 2540, "volume capacity total" 2545, "qtree capacity used" 2550 and "qtree capacity limit" 2555. Additionally, the window 2500 displays a related storage section 2560, including an entry 2565 that shows the number of volumes on the storage system and an entry 2570 that shows the number of luns in the volume. Thus, in this exemplary graphical user interface window 2500, there are ten volumes on this storage system and one lun in this volume.

Figure 26:
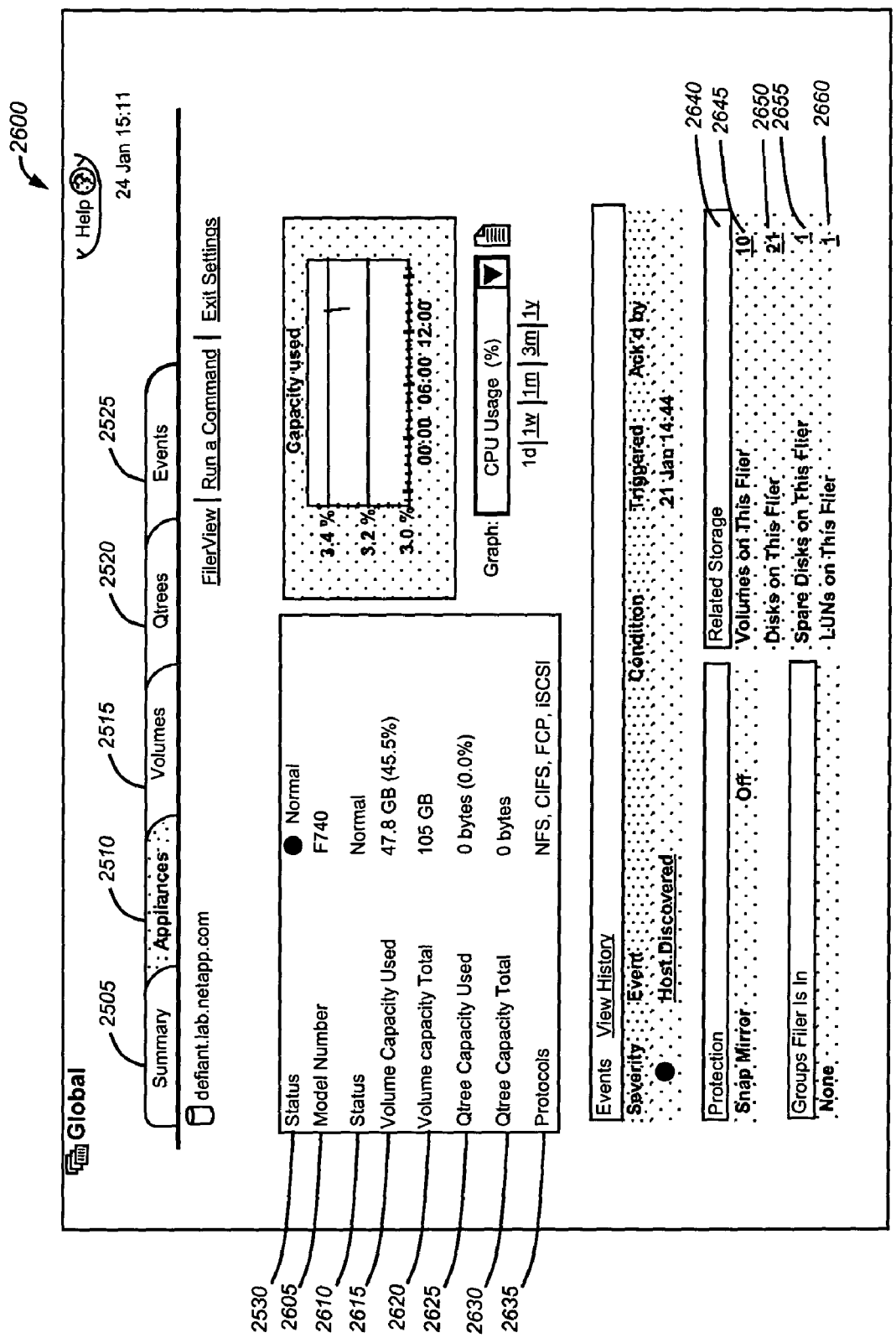
FIG. 26 is a view of a GUI window showing consolidated information for storage appliances including luns in accordance with an embodiment of the present invention.

FIG. 26 shows an exemplary GUI window 2600 wherein the appliances tab 2510 is selected to display appliance-related information. Along the left side of the window 2600, a variety of data reports is displayed including a status report 2530, a model number 2605, an operating system 2610, a volume capacity used 2615 and capacity total 2620, a qtree capacity used 2625 and limit 2630, and protocols 2635 usable by the storage appliance. As with window 2500, there is a related storage area 2640 that includes information regarding the number of volumes on the storage system (entry 2645), number of disks on this storage system (entry 2650), the number of spare disks on the storage system filer (entry 2655) and the number of luns on the storage system (entry 2660).

Figure 27:
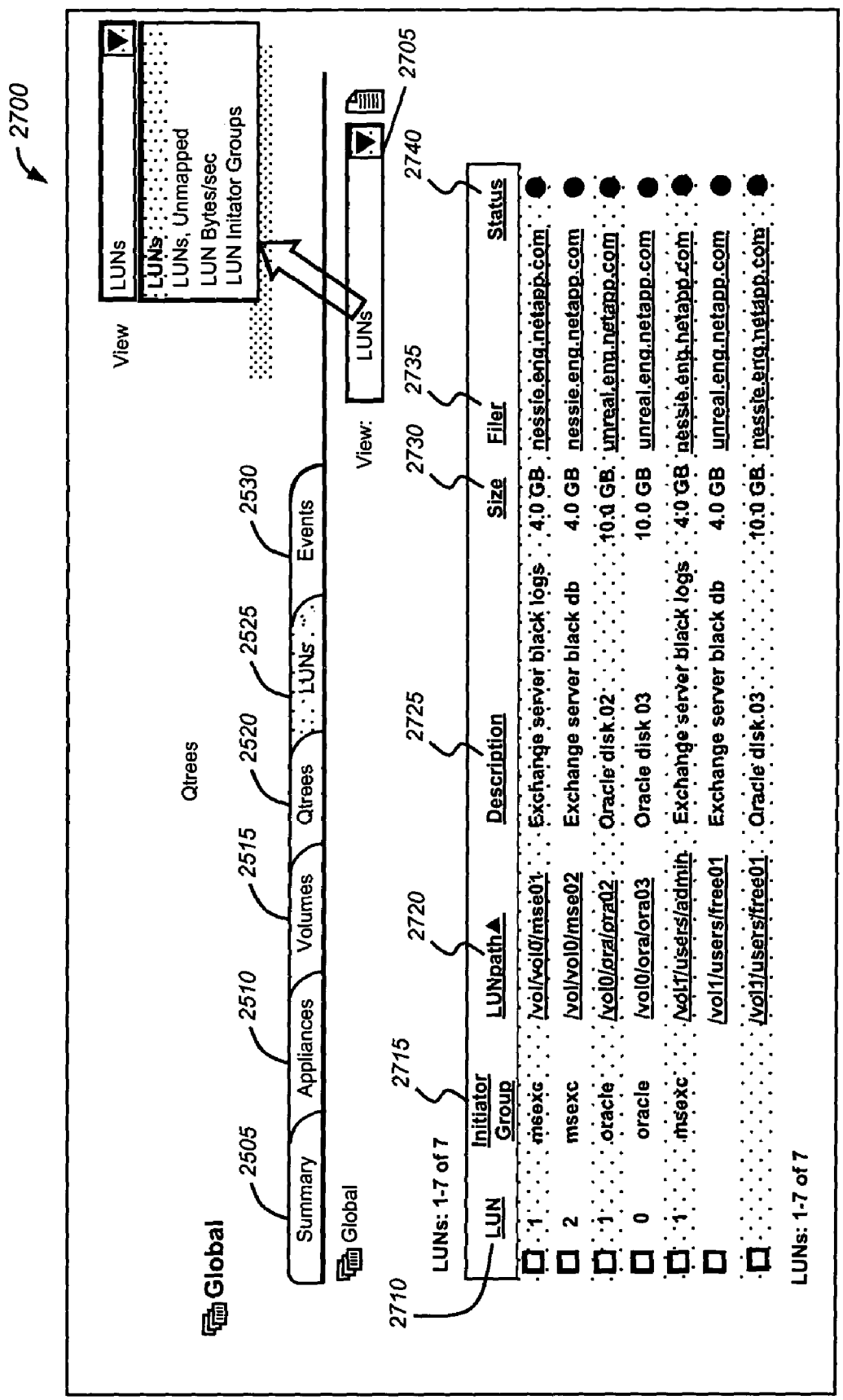
FIG. 27 is a view of a GUI window showing consolidated data for a set of luns in accordance with an embodiment of the present invention.

FIG. 27 illustrates a GUI window 2700 wherein the luns tab 2525 is activated. The window 2700 includes a drop-down menu 2705 that allows a user to select a number of views, such luns, unmapped luns, the number of bytes per second that a lun is being accessed and/or the initiator groups associated with luns. In this example, information pertaining to the luns is displayed, as denoted by the highlighted "LUN" in menu 2705. A number of columns are displayed in window 2700 including a lun column 2710, an initiator group column 2715, a lun path column 2720, a description column 2725, a size column 2730, a storage system (filer) column 2735 and a status column 2740. The lun column 2710 identifies the lun value associated with the lun. The initiator group column 2715 displays the initiator group that is associated with a lun. Similarly, the lun path column 2720 contains the path to the lun, while the description column 2725 contains a brief description of the lun, for example, "Administrator home." The size 2730 and filer 2735 columns identify the size of a lun and the storage appliance/file that serves the lun. The status column 2740 includes an indicator, which may be color coded, that alerts a user or administrator of the current status of the lun.

Figure 28:
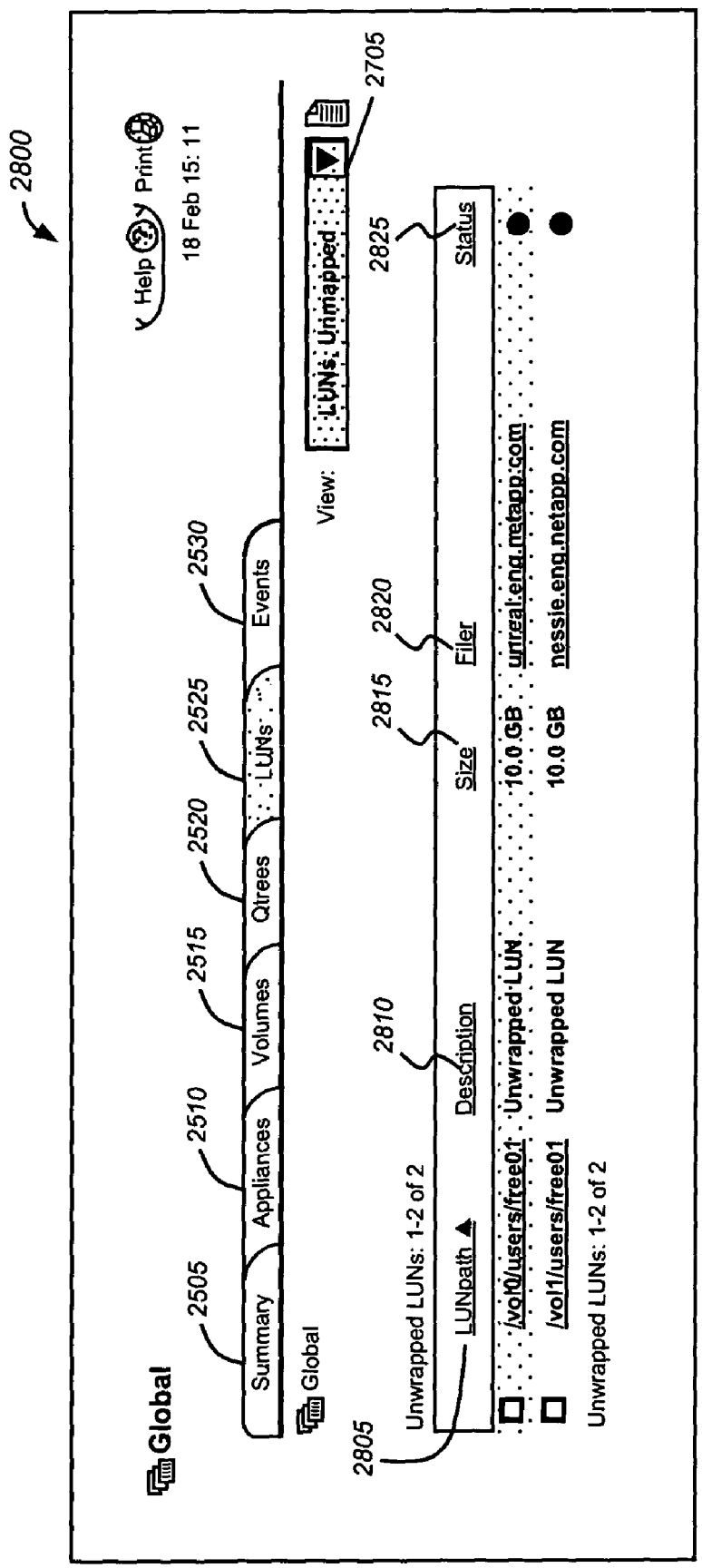
FIG. 28 is a view of a GUI window showing consolidated data for unmapped luns in accordance with an embodiment of the present invention.

FIG. 28 illustrates GUI window 2800 wherein the unmapped luns view has been selected via drop-down menu 2705. This window 2800 includes a number of columns including a lun path column 2805, a description column 2810, a size column 2815, a storage system column 2820 and a status column 2825. The lun path column 2805 lists the fully qualified pathname for each lun. The description column 2810 allows an administrator to show a description of the lun. The size field 2815 lists the size of each lun and the storage system/filer field 2820 lists the storage system that is currently serving each lun. The status field 2825 is illustratively color coded to identify whether the lun is active or inactive. For example, an active lun may be designated by a green dot while an inactive lun may be shown by a red dot.

Figure 29:
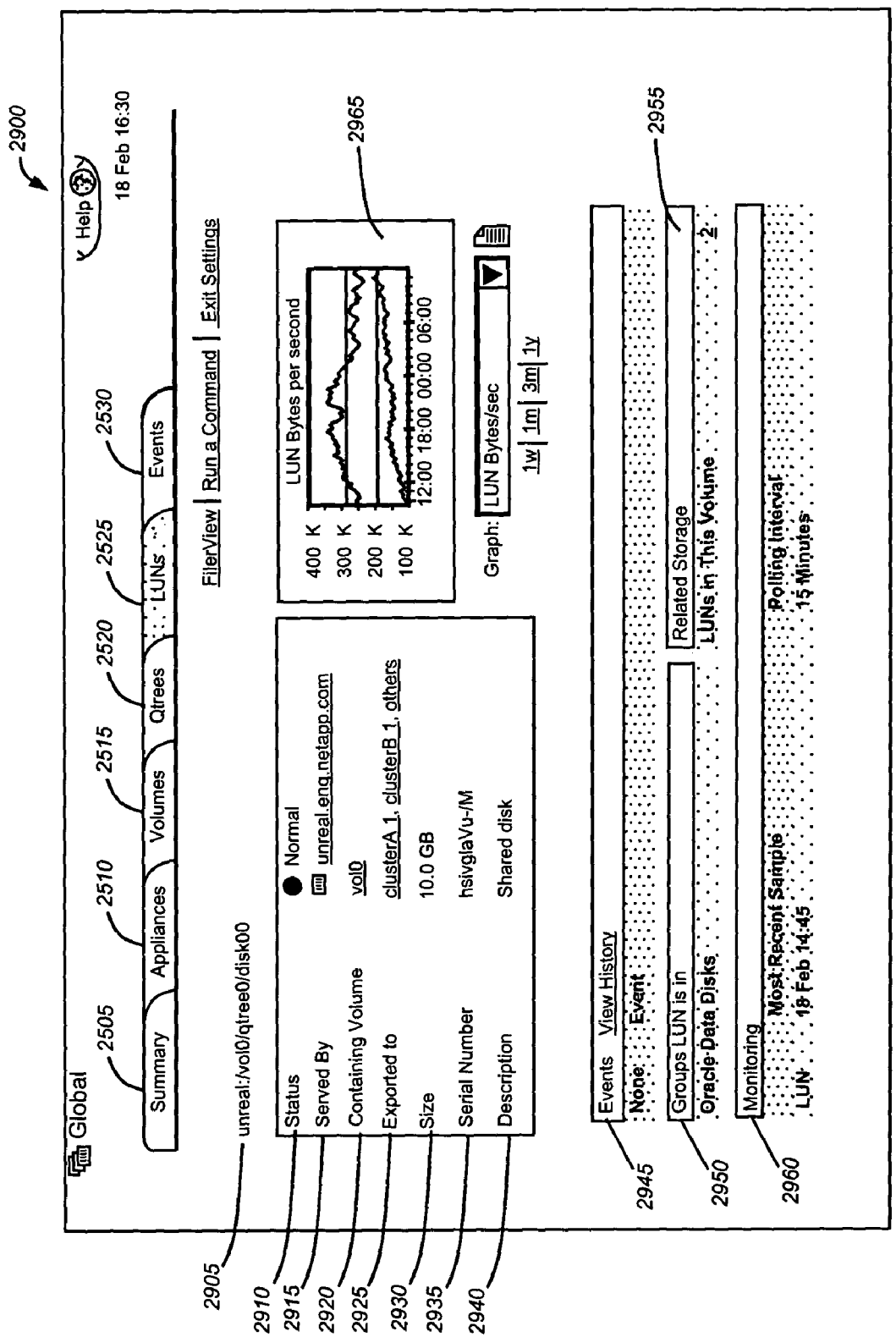
FIG. 29 is a view of a GUI window for a specific lun in accordance with an embodiment of the present invention.

FIG. 29 illustrates a GUI window 2900 wherein the bytes per second view has been selected. The window 2900 includes a bytes-per-second graph 2965 that displays the amount of data written to and from a lun. The storage system serving the lun and path to the lun are displayed in field 2905. A status indicator 2910 alerts the user or administrator as to the status (e.g., normal, error, offline, etc.) of the lun. A "served by" field 2915 identifies the storage appliance or filer that services the lun. The "exported to" field 2925 identifies to which igroups the lun has been exported. Similarly, size 2930, serial number 2935 and description 2940 fields contain the appropriate data associated with the lun. The event indicator 2945 shows any events associated with the lun that have triggered a reportable event. Such events could include, for example, falling below a minimum amount of free space or exceeding a number of access requests per a unit of time. A monitoring field 2960 identifies a time when the most recent sample of data was acquired and also the polling interval at which the monitoring software acquires sample data.

Figure 30:
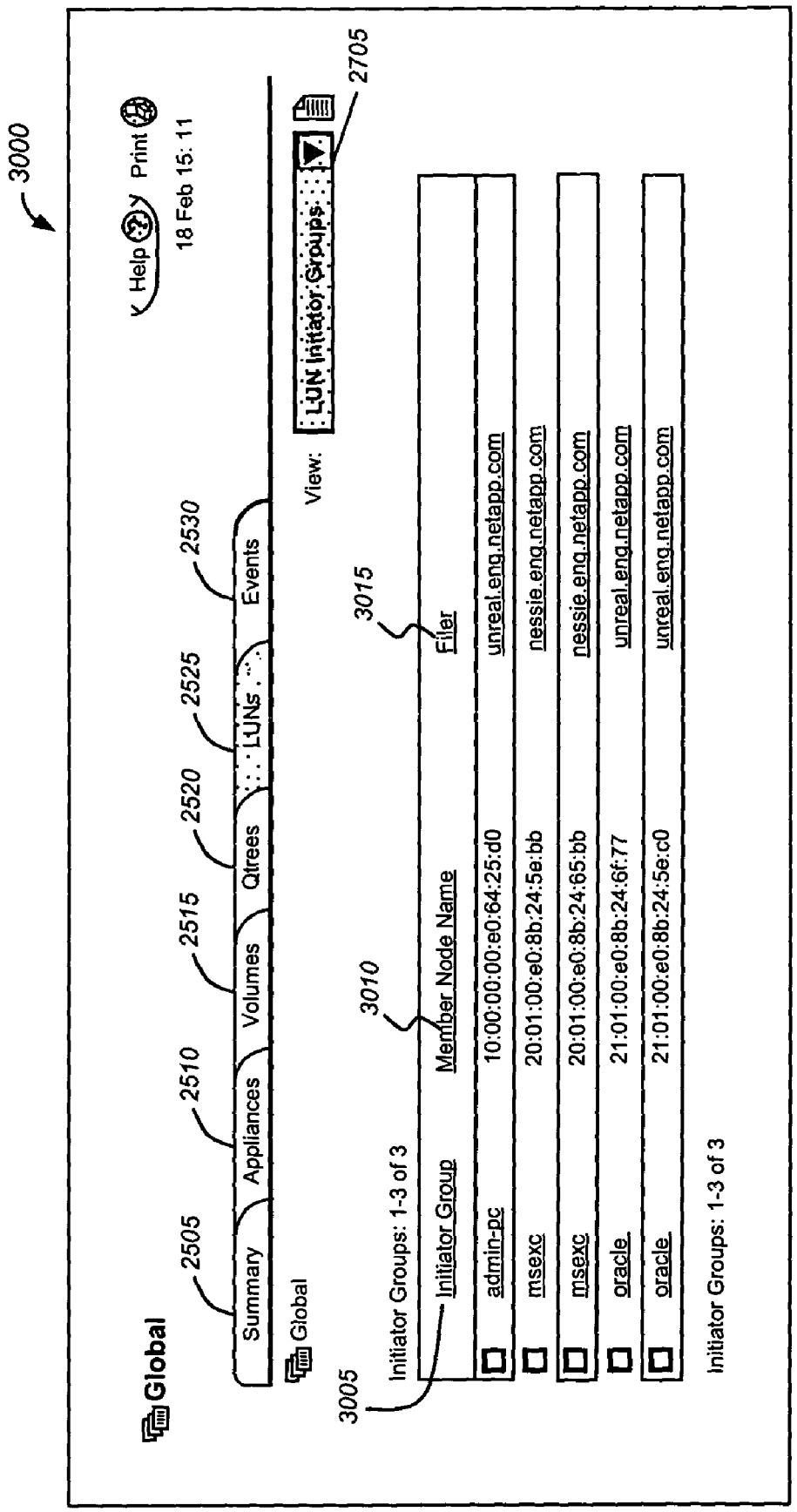
FIG. 30 is a view of a GUI window showing lun initiator groups in accordance with an embodiment of the present invention.

FIG. 30 illustrates a GUI window 3000 wherein the luns tab 2525 is selected. The window 3000 includes a series of columns including an initiator group column 3005, a member node name column 3010 and a storage system column 3015. The initiator group identifies the name of the initiator group. The member node in column 3010 contains a unique fibre channel or iSCSI node name associated with that member of the initiator group. The storage system or filer column 3015 identifies the storage system associated with each initiator group.

To again summarize, the present invention is directed to a novel user interface for use with luns or vdisks that are virtualized through a file system. Ease of use features permit the use of initiator groups (igroups) by binding one or more iSCSI or FCP addresses to a human friendly name that may later be bound to one or more luns to identify those initiators that may access the specified lun.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or any combination thereof. Accordingly this description is to be taken only by way of example and not to otherwise limit the scope of the invention. It is thus the object of the appended claims to cover all such variations and modifications as come within the true spirit and scope of the invention.

What is claimed is:

1. A method for simplifying management of a storage system having a storage operating system that virtualizes a storage space provided by disks coupled to the storage system, the method comprising the steps of:
    creating an initiator group;
    creating an logical unit number;
    mapping the logical unit number to the initiator group; and
    wherein the method obviates a need to explicitly configure and specify a set of disks used to create the logical unit number.

2. The method of clam 1 wherein the step of creating the initiator group comprises the step of identifying a name of the initiator group and one or more initiator addresses associated with the initiator group.

3. The method of claim 2 wherein the initiator addresses comprises one or more Fibre Channel world wide names.

4. The method of claim 2 wherein the initiator addresses comprises one or more Small Computer System Interface encapsulated over Transmission Control Protocol (iSCSI) identifiers.

5. The method of claim 1 wherein the step of creating the logical unit number further comprises the steps of:
    identifying a size of the logical unit number;
    identifying a path name of where the logical unit number is stored within a file system.

6. The method of claim 1 wherein the step of mapping the logical unit number to the initiator group permits initiators in the initiator group to access the logical unit number.

7. The method of claim 1 wherein the step of creating the initiator group further comprises a step of entering an initiator group (igroup) create command on a command line interface.

8. The method of claim 1 wherein the step of creating the logical unit number (lun) further comprises the step of entering a lun create command in a command line interface.

9. The method of claim 1 wherein the step of mapping the logical unit number (lun) to the initiator group further comprises a step of entering a lun map command in a command line interface.

10. The method of claim 1 wherein the step of creating the initiator group further comprises the step of selecting one or more options in a graphical user interface to create the initiator group.

11. The method of claim 1 wherein the step of creating the logical unit number further comprises the step of selecting one or more options from a graphical user interface to create the logical unit number.

12. The method of claim 1 wherein the step of mapping the logical unit number to the initiator group further comprises the step of selecting one or more options from a graphical user interface to map the logical unit number to the initiator group.

13. A method for managing a storage system with a user interface, the method comprising:
    associating one more clients with a logical name;
    creating a virtual disk on the storage system, the virtual disk created absent user specification of physical disks on the storage system for storing the virtual disk; and
    mapping the virtual disk to the logical name, such that the one or more clients that are associated with the logical name may access the virtual disk.

14. The method of claim 13 wherein the logical name is an initiator group (igroup).

15. The method of claim 14 wherein the one or more clients use Small Computer System Interface encapsulated over Transmission Control Protocol (iSCSI) as their transport protocol.

16. The method of claim 15 wherein the one or more clients are identified by an iSCSI Identifier (ID) and the step of associating further comprises the step of:
    assigning the iSCSI ID of the one or more clients to the logical name.

17. The method of claim 13 wherein the one or more clients use SCSI encapsulated over Fibre Channel (FCP) as their transport protocol.

18. The method of claim 17 wherein the one or more clients are identified by a World Wide Name (WWN) and the step of associating further comprises the step of:
    assigning the WWN of the one or more clients to the logical name.

19. The method of claim 13 wherein the virtual disk is exported as a logical unit number (lun).

20. The method of claim 19 wherein the step of creating further comprises the steps of:
    identifying a size of the lun; and
    identifying a path name of where the lun is stored within a file system.

21. The method of claim 13 wherein the user interface is a command line interface (CLI).

22. The method of claim 13 wherein the user interface is a graphical user interface (GUI).

23. A user interface for managing a storage system, the user interface comprising:
    a first command that associates one more clients with a logical name;
    a second command that creates a virtual disk on the storage system, the virtual disk created absent user specification of physical disks on the storage system for storing the virtual disk; and a third command that maps the virtual disk to the logical name, such that the one or more clients that are associated with the logical name may access the virtual disk.

24. The user interface of claim 23 wherein the logical name is an initiator group (igroup) and the first command is an igroup command.

25. The user interface of claim 23 wherein the virtual disk is exported as a logical unit number (lun) and the second command is a lun create command.

26. The user interface of claim 25 wherein the third command is a lun map command.

27. The user interface of claim 25 wherein the lun create command takes as parameters a size of the lun and a path name of where the lun is stored within a file system.

28. The user interface of claim 23 wherein the one or more clients use Small Computer System Interface encapsulated over Transmission Control Protocol (iSCSI) as their transport protocol.

29. The user interface of claim 28 wherein the one or more clients are identified by an iSCSI Identifier (ID) and the first command assigns the iSCSI ID of the one or more clients to the logical name.

30. The user interface of claim 23 wherein the one or more clients use SCSI encapsulated over Fibre Channel (FCP) as their transport protocol.

31. The user interface of claim 30 wherein the one or more clients are identified by a World Wide Name (WWN) and the first command assigns the WWN of the one or more clients to the logical name.

32. The user interface of claim 23 wherein the user interface is a command line interface (CLI).

33. The user interface of claim 23 wherein the user interface is a graphical user interface (GUI).

34. A user interface for managing a storage system, the user interface comprising:
   means for associating one more clients with a logical name;
   means for creating a virtual disk on the storage system, the virtual disk created absent user specification of physical disks on the storage system for storing the virtual disk; and
   means for mapping the virtual disk to the logical name, such that the one or more clients that are associated with the logical name may access the virtual disk.

35. A computer readable medium containing executable program instructions for enabling management of a storage system with a user interface, the executable program instructions comprising program instructions for:
   associating one more clients with a logical name;
   creating a virtual disk on the storage system, the virtual disk created absent user specification of physical disks on the storage system for storing the virtual disk; and
   mapping the virtual disk to the logical name, such that the one or more clients that are associated with the logical name may access the virtual disk.

* * * * *